(12) United States Patent
Terunuma et al.

(10) Patent No.: US 6,466,415 B1
(45) Date of Patent: Oct. 15, 2002

(54) THIN FILM MAGNETIC HEAD INCLUDING A FIRST POLE PORTION HAVING A DEPRESSED PORTION FOR RECEIVING A COIL

(75) Inventors: Koichi Terunuma, Chuo-Ku (JP); Tetsuya Mino, Chuo-Ku (JP); Katsuya Kanakubo, Chuo-Ku (JP); Noriyuki Ito, Chuo-Ku (JP)

(73) Assignee: TDK Corporation, Tokyo (JP)

( * ) Notice: Subject to any disclaimer, the term of this patent is extended or adjusted under 35 U.S.C. 154(b) by 84 days.

(21) Appl. No.: 09/604,794

(22) Filed: Jun. 28, 2000

(30) Foreign Application Priority Data

Jul. 14, 1999 (JP) ............................................ 11-199899

(51) Int. Cl.[7] .............................. G11B 5/23; G11B 5/39
(52) U.S. Cl. ........................ 360/317; 360/119; 360/126
(58) Field of Search ................................ 360/119, 126, 360/317

(56) References Cited

U.S. PATENT DOCUMENTS

| | | | |
|---|---|---|---|
| 5,452,164 A | 9/1995 | Cole et al. ................... | 360/119 |
| 5,606,478 A | 2/1997 | Chen et al. .................. | 360/126 |
| 6,118,629 A * | 9/2000 | Huai et al. ................... | 360/126 |
| 6,154,346 A * | 11/2000 | Sasaki ......................... | 360/317 |
| 6,156,375 A * | 12/2000 | Hu et al. ..................... | 427/116 |
| 6,296,776 B1 * | 10/2001 | Sasaki .......................... | 216/22 |
| 6,317,288 B1 * | 11/2001 | Sasaki ......................... | 360/126 |
| 6,337,783 B1 * | 1/2002 | Santini ........................ | 360/317 |
| 6,339,523 B1 * | 1/2002 | Santini ........................ | 360/317 |

FOREIGN PATENT DOCUMENTS

| | | |
|---|---|---|
| JP | A-60-193114 | 1/1985 |
| JP | A-5-73839 | 3/1993 |
| JP | A-6-267-776 | 9/1994 |
| JP | A-7-225917 | 8/1995 |

* cited by examiner

Primary Examiner—Jefferson Evans
(74) Attorney, Agent, or Firm—Oliff & Berridge, PLC

(57) ABSTRACT

The invention provides a thin film magnetic head including a first pole portion having depressed portion that is formed therein. The depressed portion descends, backward within the first pole portion, at a first inclination angle $\theta 1$ from a first inclination starting point P1. Then, an insulating film is filled up in the depressed portion so that it can be located up to the upper side of the surface of the first pole and have an inclined surface in the side of a medium opposing surface. Additionally, a first magnetic film of a second pole portion can have a larger saturated magnetic flux density than a second magnetic film of the second pole portion, and can include an inclined portion with a second inclination angle $\theta 2$ from a second inclination starting point P2.

18 Claims, 18 Drawing Sheets

THIN FILM MAGNETIC HEAD INCLUDING A FIRST POLE PORTION HAVING A DEPRESSED PORTION FOR RECEIVING A COIL

BACKGROUND OF THE INVENTION

1. Field of the Invention

This invention relates to a thin film magnetic head, a magnetic head device, a magnetic disk driving device and a method for manufacturing a thin film magnetic head.

2. Related Art Statement

A floating type thin film magnetic head to be used in a magnetic recording/reproducing device of a computer has at least one recording element and at least one reading element on the air outflow side of the slider thereof. As the recording element, an inductive type magnetic conversion type element is generally used, and as the reading, a magnetic conversion element using a magnetic resistive effect is used.

For realizing a high recording density in a magnetic disk using this kind of thin film magnetic head, it is required that data amount (surface recording density) to be restored in the unit area of the magnetic disk is enhanced. The surface recording density depends on the performance of the recording element, and can be enhanced by shortening the gap length between the recording poles of the recording element.

The surface recording density can be also enhanced by increasing the track number to be recorded in the magnetic disk. The track number recordable in the magnetic disk is normally represented as "TPI (track per inch)". The TPI performance of the recording element can be enhanced by downsizing the recording head to determine the width of the data track. The size of the recording head is normally known as a track width.

However, the shortening of the gap length between the recording poles and the narrowing of the track width decrease the magnetic flux in between the recording poles, resulting in the degradation of the overwrite performance. Therefore, in view of recording performance, the shortening of the gap length and the narrowing of the track width can not employed for a high density recording magnetic disk having a high coercivity Hc.

To solve this problem, the recording pole structure, in which in a recording pole portion, a magnetic film having a high saturated magnetic flux density (a first magnetic film) is provided adjacent to a gap film and a second magnetic film having a smaller saturated magnetic flux density than the first magnetic film is provided on the first magnetic film, is suggested and practically used. For example, the specification of U.S. Pat. No. 5,606,478 discloses that the part of the recording pole portion adjacent to the gap film is made of a magnetic material having a higher saturated magnetic flux, for example $Ni_{55}Fe_{45}$, than the magnetic material having a NiFe composition which is usually used for the pole portion of the above thin film magnetic head.

In addition, the specification of Kokai Publication Kokai Hei 5-73839 (JP A 5-73839) discloses that an underfilm to plate a bottom magnetic core and a top magnetic core is made of a magnetic material having a higher saturated magnetic flux density than the magnetic materials constituting the bottom magnetic core and the top magnetic core.

The recording element composed of the inductive type magnetic conversion element generally has a first pole portion, a gap film, a coil film, an insulating film and a second pole portion. The first pole portion is composed of a magnetic film which extends backward from a medium opposing surface. The gap film is provided adjacent to the first pole portion, and the second pole portion is provided adjacent to the gap film. The second pole portion is composed of a magnetic film which extends backward from the medium opposing surface and joined with the magnetic film constituting the first magnetic pole portion at its rear portion. The coil film is embedded in the insulating film, and winds up vertically the joining portion of the first and second pole portions.

In a relatively primary type pole structure, the magnetic film extended from the second pole portion used to be, as a yoke portion, formed on the organic insulating material to support the coil film. The organic insulating film is inclined and rose up, between the pole portion and the yoke portion, at a given angle on the gap film. Therefore, the magnetic film to be formed on the organic insulating film is also inclined alongside the inclined portion at the given angle of the organic insulating film. The inclination starting point of the magnetic film is called as a "Throat Height zero point", and the inclination angle is called as a "Apex Angle". The magnetic film formed on the organic insulating film constitutes the second pole portion parallel to the gap film to the Throat Height zero point from its forefront in the air bearing surface, inclined at the Apex Angle from the Throat Height zero point, and continues to the yoke portion.

The throat Height zero point directly contributes to the electro-magnetic conversion characteristics of the recording element, so required to be controlled precisely. Moreover, the Apex Angle is required to be set to a small value so as not to be saturated magnetically for transmitting a magnetic flux generated from a writing current in the coil film effectively to the pole portion.

In the conventional pole structure in which the magnetic film extended from the second pole portion is formed on the organic insulating film, however, since the inclination starting point and inclination angle of the organic insulating film changes due to its applying process and baking process, it is difficult to control and set the Throat Height zero point. And the Apex Angle becomes relatively large.

The specifications of U.S. Pat. No. 5,606,478 and Kokai Publication Kokai Hei 5-73839 which are proposed as a high density recording means do not teach to decrease the Apex Angle.

For ironing out the above problem, for example, the specification of Kokai Publication Kokai Hei 7-225917 (JP A 7-225917) discloses that the second pole portion and its yoke portion are formed independently. In this case, since the rising start point of the yoke portion corresponds to the Throat Height zero point, the Throat Height zero point can be controlled and set high precisely.

However, the insulating film to support the coil film has its inclined surface. Therefore, the decreasing of the Apex Angle of the yoke portion continuing the second pole portion is restricted, so that the magnetic flux transmission efficiency for the pole portion and the overwrite characteristic can not be much improved.

Moreover, the specification of Kokai Publication Kokai Hei 7-267776 (JP A 267776) discloses that in the above pole structure in which the second pole portion and the yoke portion thereof are formed independently, the insulating film to support the coil film is flattened so that its surface can have the same level as that of the second pole portion, and the yoke portion to continue the second pole portion is formed on the flattened surface of the insulating film. In this case, since the edge portion of the second pole portion corresponds to the Throat Height zero point, the Throat Height zero point can be set precisely.

However, since the edge portion of the second pole portion is almost orthogonal to the gap film and the almost orthogonal angle for the gap film corresponds to the Apex Angle, the magnetic flux transmission efficiency for the pole portion and the overwrite characteristic can not be much improved.

Furthermore, Kokai publication Kokai Sho 60-193114 (JP A 60-193114) discloses that a depressed portion is formed on the surface of the slider substrate and a magnetic film continuing the first pole portion is formed in the depressed portion to manufacture a thin film magnetic head having a low step structure. In this case, however, it is difficult to control the Throat Height zero point precisely.

SUMMARY OF THE INVENTION

It is an object of the present invention to provide a thin film magnetic head having a recording pole structure of high recording performance.

It is another object of the present invention to provide a thin film magnetic head having a recording pole structure to be used for high density recording.

It is still another object of the present invention to provide a thin film magnetic head not to be saturated magnetically having excellent high frequency recording characteristics.

It is further object of the present invention to provide a thin film magnetic head having a small Apex Angle in which a Throat Height zero point can be controlled high precisely.

It is still further object of the present invention to provide a magnetic head device and a magnetic disk driving device using the above thin film magnetic head.

It is another object of the present invention to a manufacturing method suitable for the thin film magnetic head.

For achieving the above objects, a thin film magnetic head of the present invention includes a slider and at least one recording element. One surface of the slider constitutes a medium opposing surface. The recording element, formed on the slider, has a first pole portion, a gap film, a coil film, an insulating film and a second pole portion.

The first pole portion is composed of a magnetic film, extending backward from the medium opposing surface, and has a depressed portion. The depressed portion descends at a first inclination angle $\theta 1$ from a first inclination starting point provided on the surface of the magnetic film backward from the first pole portion.

The insulating film is formed so as to embed the depressed portion and be located up to the upper side from the surface of the magnetic film, and then, has its inclined surface at least in the side of the medium opposing surface.

The gap film is adjacent to the first pole portion, and has its inclined portion alongside the inclined surface of the insulating film. The coil film is formed so as to be embedded into the insulating film.

The second pole portion has a first magnetic film and a second magnetic film. The first magnetic film, formed adjacent to the gap film, has a larger saturated magnetic flux density than the second magnetic film, and has its inclined portion of a second inclination angle $\theta 2$ from a second inclination starting point. The second inclination starting point is located at the base portion of the inclined portion of the gap film.

The second magnetic film, adjacent to the first magnetic film and formed on the insulating film, extends backward from the medium opposing surface and, is joined with the magnetic film constituting the first pole portion.

In the thin film magnetic head of the present invention, the slider has the medium opposing surface, and the recording element is provided on the slider. Therefore, the air bearing generated in between the medium opposing surface of the slider and the medium by rotating the medium at a high velocity floats the slider, and in this condition, the medium can be magnetically recorded by the recording element.

In the recording element, the magnetic film continuing to the first pole portion extends backward from the medium opposing surface, and the gap film is provided adjacent to the first pole portion. Moreover, a first magnetic film included in the second pole portion is provided adjacent to the gap film. Moreover, a second magnetic film included in the second pole portion is adjacent to the first magnetic film, extending backward from the medium opposing surface, and is joined with the magnetic film constituting the first pole portion at its rear portion. The coil film is embedded into the insulating film.

This recording element can transmit the magnetic flux generated from the writing current in the coil film to the first pole portion and the second pole portion via the magnetic film constituting the first pole portion and the second magnetic film, and can generate a writing magnetic field at the gap film. The writing magnetic field enables the medium to be magnetically recorded.

The magnetic film continuing to the first pole portion has the depressed portion to constitute a low step structure which contributes to the decreasing of its Apex Angle. As mentioned above, although the low step structure having the depressed portion on the slider substrate is disclosed in Kokai Publication Kokai Sho 60-193114, the depressed portion is formed on the surface of the magnetic film continuing the first pole portion, not on the slider substrate in this invention. According to the low step structure of the present invention, the slider substrate has its flat surface, on which the magnetic film can be formed, so that the magnetic film can be easily formed and controlled in its film thickness.

The depressed portion is formed so as to descend at the first inclination angle $\theta 1$ from the first inclination starting point provided on the surface of the magnetic film backward from the first pole portion. The first inclination angle $\theta 1$ corresponds to the Apex Angle of the magnetic film continuing to the first pole portion, and thus, is set to a suitable value so that the magnetic film can not be saturated magnetically. The first inclination angle is preferably set to a value within 20 degrees to 60 degrees.

The insulating film to support the coil film is located up to the upper side from the surface of the magnetic film on which the depressed portion is formed, and has an inclined surface at least in the side of the medium opposing surface. The inclined surface of the insulating film contributes to the Apex Angle. In this case, since the insulating film is formed to be embedded in the depressed portion and thereby, the low step structure is already formed, the inclination angle of the inclined surface of the insulating film which contributes to the Apex Angle is decreased.

Of the first and second magnetic films in the second pole portion, the first magnetic film has a larger saturated magnetic flux density than the second magnetic film, and is provided adjacent to the gap film. In this case, even though the gap length between the recording poles and the track width are narrowed for realizing high density recording, the limited upper value of magnetic flux density to saturate the recording pole magnetically can be increased and thereby, the overwrite characteristic and recording performance thereof can be enhanced.

The first magnetic film has the inclined portion of the second inclination angle θ2 from the second inclination starting point which is located at the base portion of the inclined portion of the gap film alongside the inclined surface of the insulating film. The second inclination starting point may be used for the Throat Height zero point of the first magnetic film. The second inclination angle θ2 corresponds to the Apex Angle of the first magnetic film. Since the Apex Angle related with the magnetic saturation of the recording pole portion in the recording element is determined by the first magnetic film having a magnetic material having a large saturated magnetic flux density, the magnetic saturation is not more likely to occur in the recording pole portion. Therefore, the thin film magnetic head having a high recording performance can be obtained.

The second inclined angle θ2 is set to a suitable value so that the second magnetic film continuing to the second pole portion may not be saturated magnetically. The second inclined angle θ2 is preferably set to a value within 20 degrees to 60 degrees.

It is desired that the second inclination starting point is located nearer the side of the medium opposing surface than the first inclination starting point. In this case, the second inclination starting point corresponds to the Throat Height zero point. Since the first and second magnetic films constituting the second pole portion are formed after the magnetic film constituting the first pole portion, the Throat Height zero point can be determined higher precisely than the case that the first inclination starting point of the magnetic film constituting the first pole portion is used for the Throat Height zero point.

The other objects, constructions and advantages of the present invention will be described in detail, with reference to the attached drawings in the following embodiments.

BRIEF DESCRIPTION OF THE DRAWINGS

For a better understanding of this invention, reference is made to the attached drawings, wherein.

DETAILED DESCRIPTION OF PREFERRED EMBODIMENTS

Figure 1:
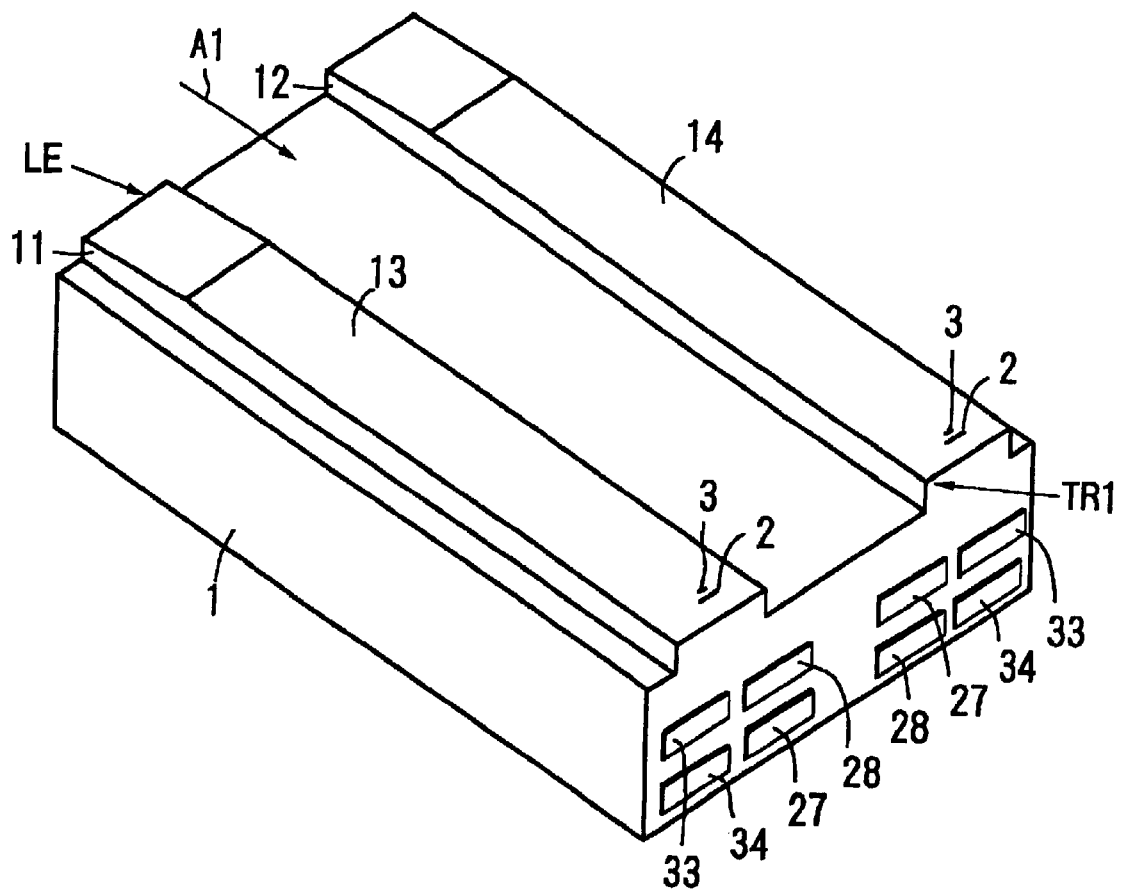
FIG. 1 is a perspective view of the thin film magnetic head of the present invention.
Figure 2:
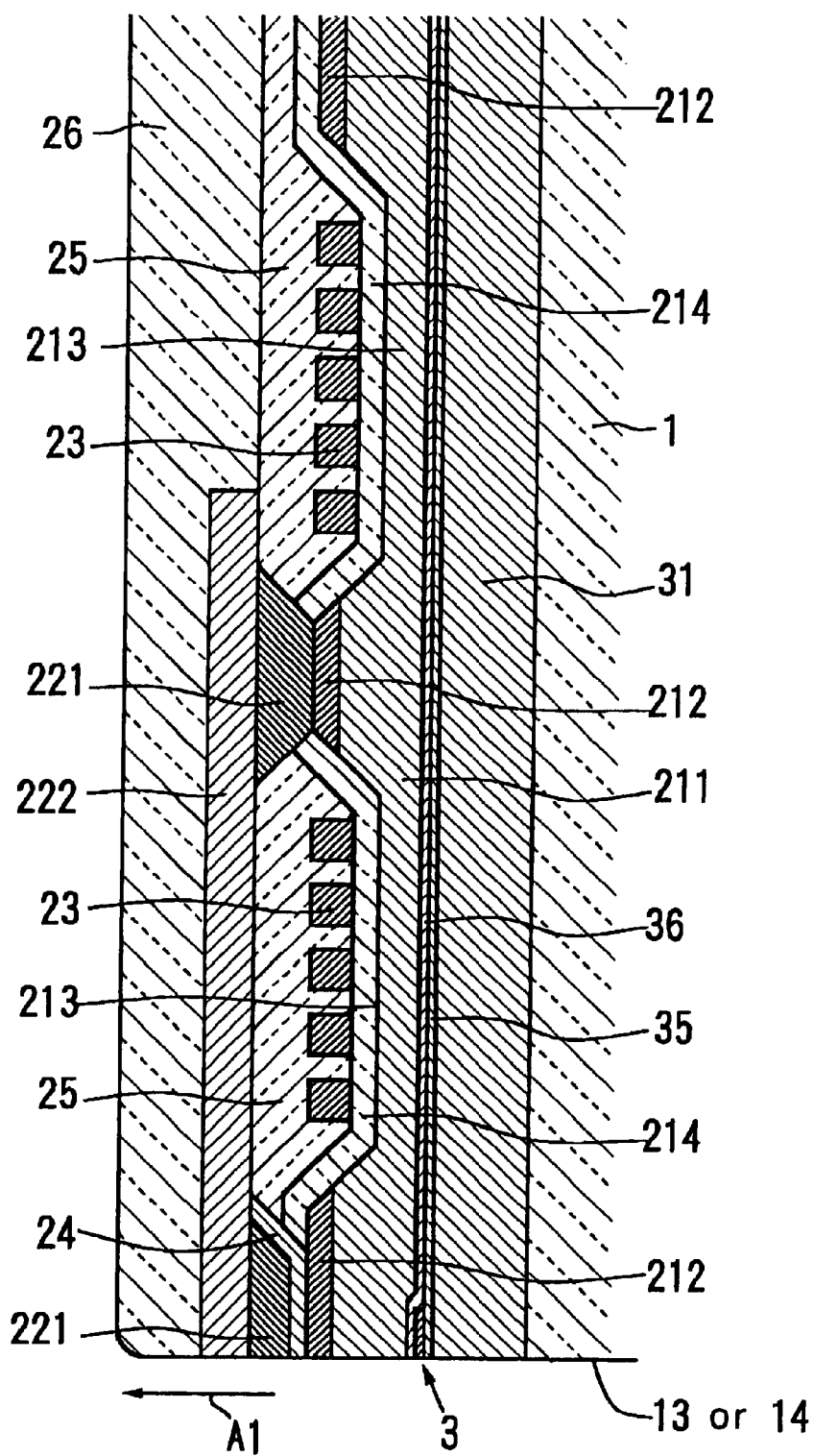
FIG. 2 is an enlarged sectional view of the thin film magnetic head shown in FIG. 1.
Figure 3:
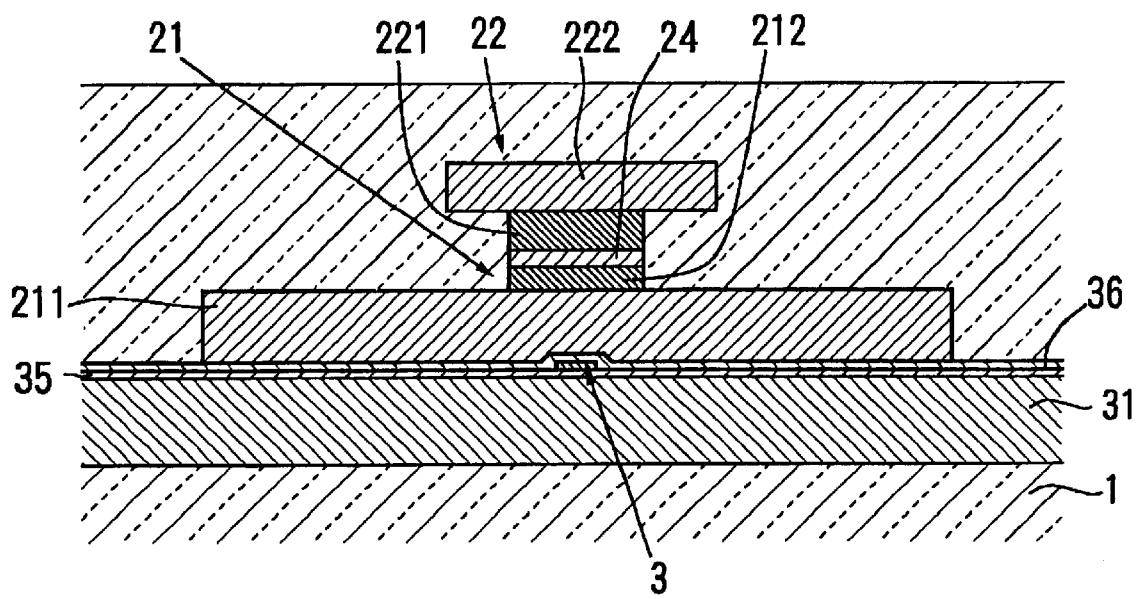
FIG. 3 is an enlarged sectional view of the pole portion of the thin film magnetic head shown in FIGS. 1 and 2.
Figure 4:
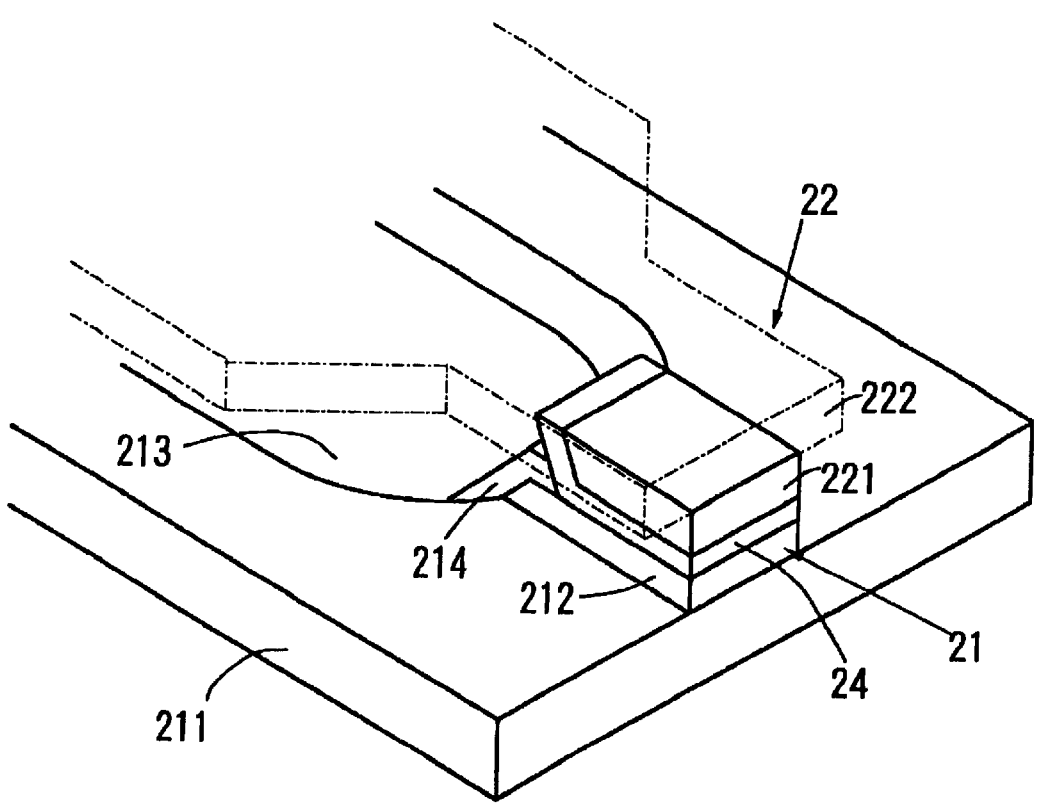
FIG. 4 is a perspective view of the pole portion of the thin film magnetic head in FIGS. 1–3.

FIG. 1 is a perspective view of the thin film magnetic head of the present invention, and FIG. 2 is an enlarged sectional view of the thin film magnetic head shown in FIG. 1. FIG. 3 is an enlarged sectional view of the pole portion of the thin film magnetic head shown in FIGS. 1 and 2, and FIG. 4 is a perspective view of the pole portion of the thin film magnetic head in FIGS. 1–3, and FIG. 5 is an enlarged sectional view of the pole portion of the thin film magnetic head shown in FIGS. 1–4. In the figures, the size of each part is exaggerated.

The illustrated thin film magnetic head comprises a slider 1, at least one recording element 2 and a reading element 3 composed of a magneto-resistive effective element (hereinafter, often called as a "MR reading element").

The slider 1 has rail parts 11 and 12 on its medium opposing surface, and the surfaces of the rail parts 11 and 12 are employed as air bearing surfaces (hereinafter, often called as "ABSs") 13 and 14. The slider 1 does not always have the two rail parts 11 and 12, and may have one to three rail parts. Moreover, the slider may have a flat surface having no rail part. For improving its floating characteristic, the slider may have various medium opposing surfaces with geometrical shapes. The present invention can be applied for the sliders having the above various types of surface. The slider 1 is made of a ceramic material such as AlTiC.

The recording elements 2 and MR reading element 3 are provided on either edge or both edges of the rail parts 11 and 12 in a medium-moving direction al. The medium-moving direction al corresponds to the outflow direction of air at the time of the high velocity moving of the recording medium.

The recording element 2 is stacked on the MR reading element 3. Conversely, the MR reading element 3 may be stacked on the recording element 2. The recording element 2 includes a recording pole portion. The recording pole portion has a first pole portion 21, a gap film 24 adjacent to the first pole portion 21 and a second pole portion 22 adjacent to the gap film 24.

The first pole portion 21 includes a magnetic film 221. The magnetic film 211 is formed, of a soft magnetic material such as NiFe, CoFe, CoNiFe, in a thickness of 0.5 $\mu$m to 4 $\mu$m. The magnetic film 211 is elongated backward from the ABSs 13 and 14 to function as a first yoke portion, too. The first pole portion 21 is composed of the magnetic film which extends backward from the ABSs 13 and 14 and has a depressed portion 213 thereon. The depressed portion 213 is formed so as to descend at a first inclination angle $\theta 1$ from a first inclination starting point P1 provided, backward from the first pole portion 21, on the magnetic film 211 (see, FIG. 5).

Figure 5:
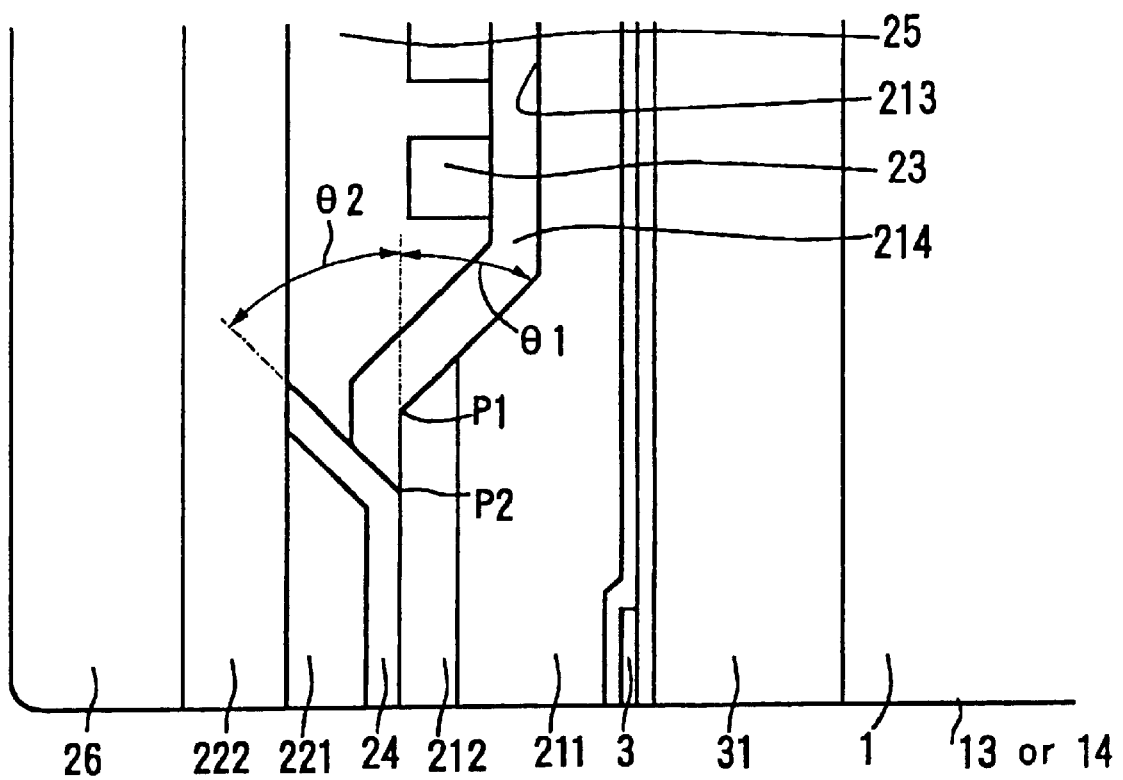
FIG. 5 is an enlarged sectional view of the pole portion of the thin film magnetic head shown in FIGS. 1–4.

In FIG. 5, the pole portion 21 has, on the magnetic film 211, a magnetic film 212 having a larger saturated magnetic flux density than the film 211. The magnetic film 212 is made of a large coercivity magnetic material such as FeN, FeMN, FeMC, FeMON (M=B, Al, Si, Cr, Ti, Hf, Nb, Ta, Zr, Mo, etc.).

An insulating film 25 is formed so as to embed the depressed portion 213 and to be located up to the upper side of the surface of the magnetic film 211, and has an inclined surface in the side of the ABSs 13 and 14.

The gap film 24 has an inclined portion alongside the inclined surface of the insulating film 25. The gap film 24 may be made of a non-magnetic insulating material such as $Al_2O_3$, $SiO_2$ or a non-magnetic metallic material. In making the film of the non-magnetic insulating material such as $Al_2O_3$, $SiO_2$, a sputtering method etc. may be used. In making the film of the non-magnetic metallic material, a plating method or a sputtering method can be used. The thickness of the gap film is preferably 0.01–0.5 $\mu$m.

The second pole portion 22 includes a first magnetic film 221 and a second magnetic film 222. The first magnetic film 221 has a larger saturated magnetic flux density than the second magnetic film 222 and is located adjacent to the gap film 24. The first magnetic film 221 is made of a large coercivity magnetic material such as FeN, FeMN, FeMC, FeMON (M=B, Al, Si, Cr, Ti, Hf, Nb, Ta, Zr, Mo, etc.). The second magnetic film 222 is formed, of a soft magnetic material such as NiFe, CoFe, CoFeNi, in a thickness of about 3 $\mu$m to 5 $\mu$m. As the forming method, a dry-etching method to narrow the track width as well as a frame-plating method may be employed. The details will be described hereinafter.

The first magnetic film 221 has a larger saturated magnetic flux density than the second magnetic film 222, located adjacent to the gap film, and has an inclined portion of a second inclination angle $\theta 2$ from a second inclination starting point P2 which is located at the base portion of the inclined portion of the gap film 24 provided alongside the inclined surface of the insulating film 25(see, FIG. 5).

The second magnetic film 222 is adjacent to the first magnetic film 221. The second magnetic film 222 is elongated backward from the ABSs 13 and 14 alongside the surface of the coil insulating film 25 to support a coil film 23 to function as a second yoke portion. The rear portion of the second magnetic film 222 is joined with the magnetic film 211 elongated from the first pole portion 21 so as to complete a magnetic circuit. In FIG. 5, the first magnetic film 221 is provided only at the recording pole portion, but may be entirely under the second magnetic film 222.

The layer number and thickness of the insulating film 25 depends on the layer number and the thickness of the coil film 23. The insulating film 25 may be made of an organic insulating material or a ceramic material. In this embodiment, the insulating film 25 is made of a non-magnetic material such as $Al_2O_3$ or $SiO_2$.

The coil film 23 is formed of a conductive material such as Cu. The thickness of the coil film 23 is preferably 2–5 $\mu$m. The coil film 23 is preferably formed by a frame plating method, etc. The coil film 23 supplies a magnetic flux generated from a wiring current for the thin film magnetic circuit composed of the magnetic film 211 extending backward from the first pole portion 21, the first and second magnetic films 221 and 222, and the gap film 24. The coil film 23 is supported by the insulating film 25 and is formed so as to wind spirally the rear portion of the magnetic circuit. Both ends of the coil film 23 are conductively connected to taking out electrodes 27 and 28 (see, FIG. 1). The winding number and layer number of the coil film 23 is not restricted.

The area around the first and second pole portions 21, 22 and the gap film 24 is embedded by a non-magnetic insulating film 27 made of $Al_2O_3$, $SiO_2$, etc. Moreover, the recording element 2 is covered with a protection film 26 entirely. The protection film 26 may be formed of an insulating material such as $Al_2O_3$, $SiO_2$, etc. Moreover, the thickness of the protection film 26 is preferably about 5 $\mu$m to 50 $\mu$m by sputtering, etc. An insulating film 214 is stack on the bottom surface of the depressed portion 213 made of an insulating material such as $Al_2O_3$ or $SiO_2$.

As the MR reading element 3, various film structures have been proposed and practically used. For example, a MR element using an arusotropic magnetoresistive (IMR) effective element made of permally, etc., a giant magnetoresistive (GMR) effective film made of a spin valve structure-magnetic material or a perovskite type magnetic material, or a ferromagnetic tunnel junction element is exemplified. In this invention, any kind of the above film structures may be employed. The MR reading element 3 is placed, between a first shield film 31 and the first magnetic film 211 doubling as a second shield film, in insulating films 35 and 36. The insulating films 35 and 36 are made of alumina, etc. The MR reading element 3 is connected to the taking out-electrodes 33 and 34 (see, FIG. 1) via leading conductors.

In the illustrated thin film magnetic head of the present invention, the slider 1 has ABSs 13 and 14 on its medium opposing surface, and the recording element 2 is provided on the slider 1. Therefore, the air bearing generated in between the ABSs 13, 14 of the slider and the medium at the time of the high velocity rotation of the medium can float the slider 1 and thereby, the medium is magnetically wrote by the recording element 2. In this embodiment, since the thin film magnetic head also has the MR reading element 3, it can read out the information in the medium which is magnetically recorded.

In the recording element 2, the magnetic film 211 continuing to the first pole portion 21 is elongated backward from the ABSs 13 and 14, and the gap film 24 is provided adjacent to the first pole portion 21. The first magnetic film 221 included in the second pole portion 22 is provided adjacent to the gap film 24. Moreover, the second magnetic film 222 included in the second pole portion 22 is provided adjacent to the first magnetic film 221, elongated backward from the ABSs 13 and 14, and is joined with the magnetic film 211 constituting the first pole portion 21 at its rear portion. The coil film 23 is embedded into the insulating film 25.

Therefore, the magnetic flux generated from the writing current in the coil film 23 is transmitted to the first and second pole portions 21 and 22 via the magnetic film 211 constituting the first magnetic pole portion 21 and the second magnetic film 222, and generates a writing magnetic field at the gap film 24. The writing magnetic field enables the medium to be magnetically recorded.

The magnetic film 211 continuing to the first pole portion 21 has the depressed portion 213 thereon to constitute a low step structure which contributes to the decreasing of its Apex Angle. As mentioned above, although the low step structure having the depressed portion on the slider substrate 1 is disclosed in Kokai Publication Kokai Sho 60-193114, the depressed portion is formed on the surface of the magnetic film 211 continuing the first pole portion 21, not on the slider substrate in this invention. According to the low step structure of the present invention, the slider substrate has its flat surface, on which the magnetic film 211 can be formed, so that the magnetic film 211 can be easily formed and controlled in its film thickness.

The depressed portion 213 is formed on the magnetic film 211 continuing to the first pole portion 21 so as to descend at the first inclination angle θ1 from the first inclination starting point P1 provided on the surface of the magnetic film 212 backward from the first pole portion 21. The first inclination angle θ1 corresponds to the Apex Angle of the magnetic film 211 continuing to the first pole portion 21, and thus, is set to a suitable value so that the magnetic film 212 formed on the magnetic film 211 continuing to the first pole portion 21 can not be saturated magnetically. The first inclination angle is preferably set to a value within 20 degrees to 60 degrees.

The insulating film 25 is located up to the upper side from the surface of the magnetic film 212, and has an inclined surface at least in the side of the ABSs 13 and 14. The second inclination angle θ2 of the inclined surface of the insulating film 25 contributes to the Apex Angle of the first magnetic film 221. In this case, since the insulating film is formed to be embedded in the depressed portion and thereby, the low step structure is already formed, the second inclination angle θ2 of the inclined surface of the insulating film 25 which contributes to the Apex Angle is decreased.

Of the first and second magnetic films 221 and 222 in the second pole portion, the first magnetic film 221 has a larger saturated magnetic flux density than the second magnetic film 222, and is provided adjacent to the gap film 24. In this case, even though the gap length between the recording poles and the track width are narrowed for realizing high density recording, the limited upper value of magnetic flux density to saturate the recording pole magnetically can be increased and thereby, the overwrite characteristic and recording performance thereof can be enhanced.

The first magnetic film 221 has the inclined portion of the second inclination angle θ2 from the second inclination starting point P2 which is located at the base portion of the inclined portion of the gap film alongside the inclined surface of the insulating film. The second inclination starting point P2 may be used for the Throat Height zero point of the first magnetic film. The second inclination angle θ2 corresponds to the Apex Angle of the first magnetic film 221. Since the Apex Angle related with the magnetic saturation of the recording pole portion in the recording element is determined by the first magnetic film 221 having a magnetic material having a large saturated magnetic flux density, the magnetic saturation is not more likely to occur in the recording pole portion. Therefore, the thin film magnetic head having a high recording performance can be obtained.

The second inclined angle θ2 is set to a suitable value so that the second magnetic film 222 continuing to the second pole portion 22 may not be saturated magnetically. The second inclined angle θ2 is preferably set to a value within 20 degrees to 60 degrees.

Figure 6:
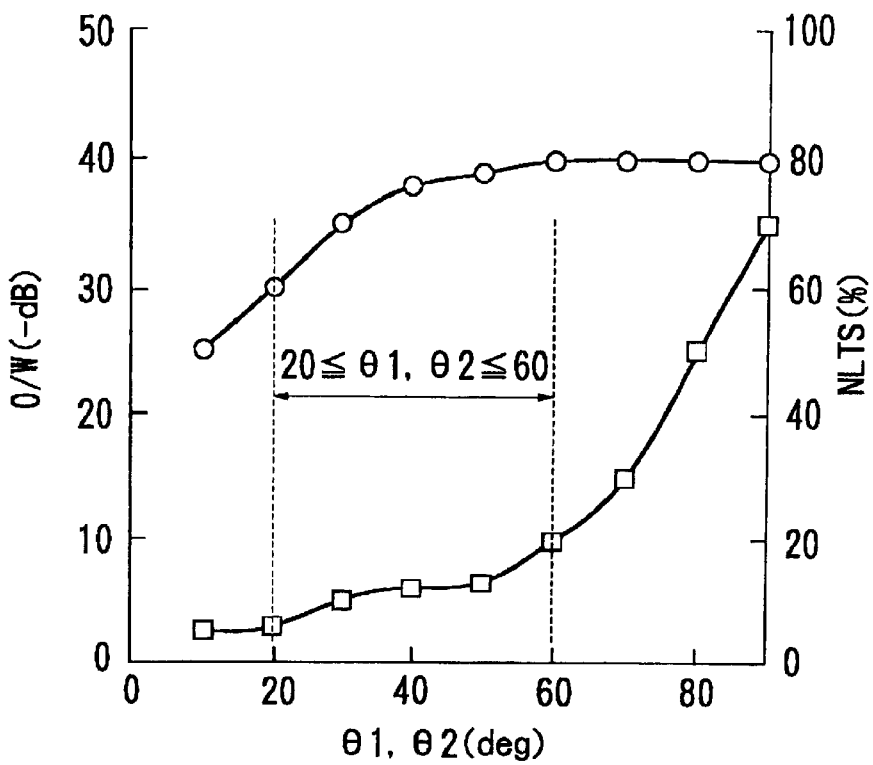
FIG. 6 is graphs showing the correlations between the first and second inclination angles θ1, θ2 and the overwrite characteristic (O/W) and between the first and second inclination angles θ1, θ2 and NLTS (%)in the thin film magnetic head shown in FIGS. 1–4.

FIG. 6 shows the correlations between the first and second inclination angles θ1, θ2 and the overwrite characteristic (O/W) and between the first and second inclination angles θ1, θ2 and NLTS (non-linear transition shift) (%)in the above thin film magnetic head. In FIG. 6, the left side longitudinal axis designates the O/W (-dB) and the right side longitudinal axis designates the NLTS (%). In this case, the thickness d of the magnetic film 212 and the first magnetic film 221 are set to 2 μm, respectively. As shown in FIG. 6, when the first and second inclination angles θ1 and θ2 are decreased below 20 degrees, the O/W (-dB) is degraded below -30 dB. When the first and second inclination angles θ1 and θ2 are increased beyond 60 degrees, the O/w (-dB) is enhanced, but the NLTS is degraded beyond 20 (%). When the first and second inclination angles θ1 and θ2 are within 20 degrees to 60 degrees, both the 0/W and NLTS are enhanced.

The thickness of the magnetic film 212 included in the first pole portion 21 and the first magnetic film 221 included in the second pole portion 22 are preferably 2 μm or below.

Figure 7:
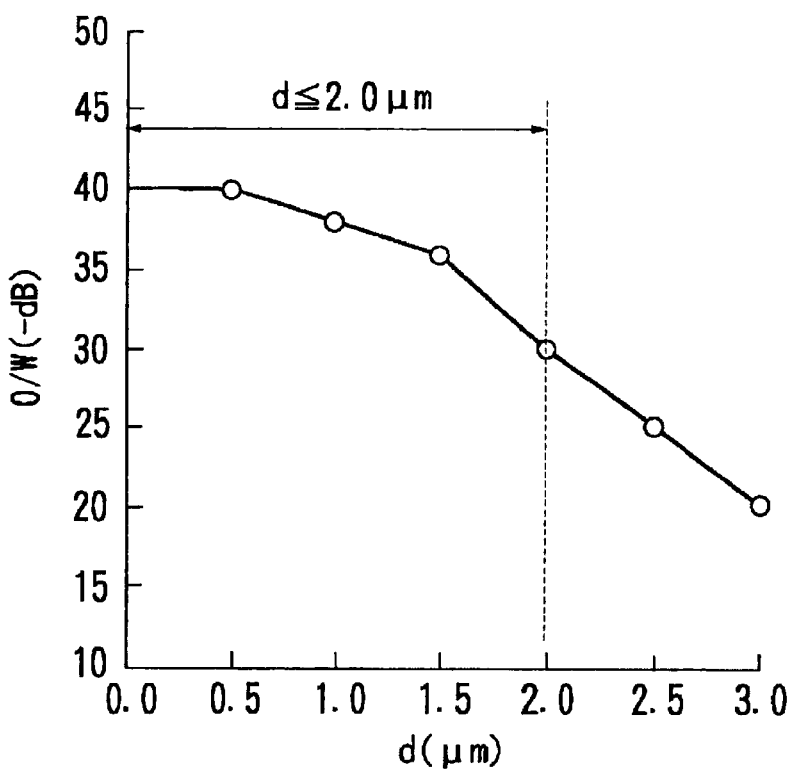
FIG. 7 is a graph showing the correlation between the thickness d (μm) of the magnetic film and the O/W (–dB) in the thin film magnetic head shown in FIGS. 1–4.

FIG. 7 shows the relation between the thickness d (μm) of the magnetic film 212 and the first magnetic film 221 and the O/W (-dB), on condition that the first and second inclination angles θ1 and θ2 are 60 degrees, respectively. As shown in FIG. 7, when the thickness d is increased beyond 2 μm, the O/W characteristics is degraded linearly. When the thickness d is 2 μm or below, the O/W characteristic is enhanced. In this case, even though the thickness is increased within the range of 2 μm or below, the O/W characteristic is a little degraded.

It is desired that the second inclination starting point P2 is located nearer the side of the ABSs 13 and 14 than the first inclination starting point P1. In this case, the second inclination starting point P2 corresponds to the Throat Height zero point. Since the first and second magnetic films 221 and 222 constituting the second pole portion 22 are formed after the magnetic films 211 and 212 constituting the first pole portion 21, the Throat Height zero point can be determined higher precisely than the case that the first inclination starting point P1 of the magnetic film 212 constituting the first pole portion 21 is used for the Throat Height zero point.

Figure 8:
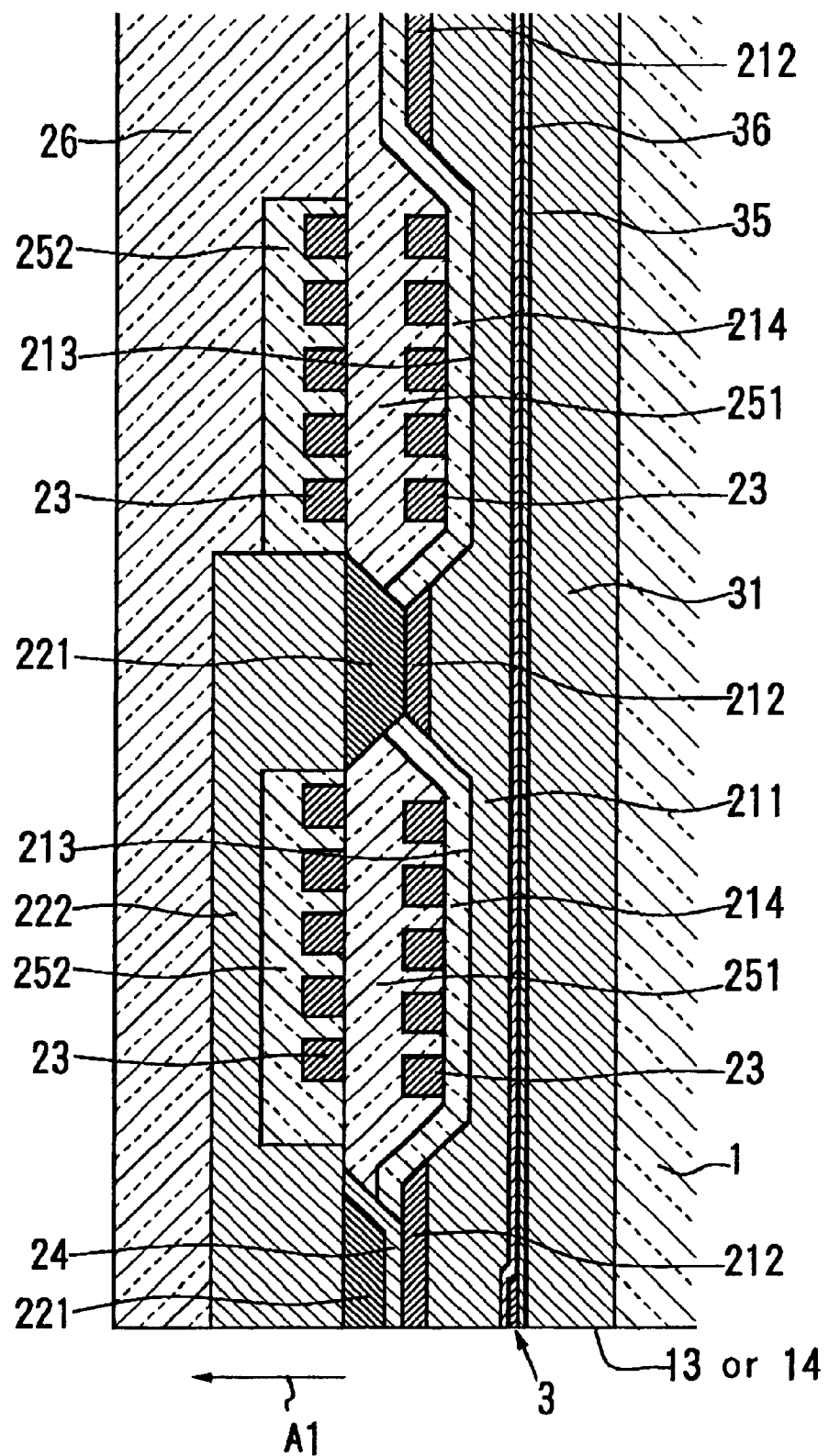
FIG. 8 is a cross sectional view showing another embodiment in the thin film magnetic head of the present invention.

FIG. 8 is a cross sectional view showing another embodiment in the thin film magnetic head of the present invention. In this figure, the same reference is given to the same part as the one in the above figures. The thin film magnetic head shown in FIG. 8 has the two-layered coil film 23. The coil film 23 may have a three or more-layered structure. In this embodiment, the insulating film 25 is composed of a bottom insulating film 251 and a top insulating film 252 which are provided on the layer number of the coil film 23 and are stacked in turn. The bottom insulating film 251 is formed to embed a depressed portion 213 and has its surface with the same level as that of the first magnetic film 221.

The second magnetic film 222 is stacked on the bottom insulating film 252. The forefront of the second magnetic film 222 is stacked on the first magnetic film 221 in the side of the ABSs 13 and 14, and the rear portion of the second magnetic film 222 is magnetically joined with the magnetic films 211 and 212 constituting the first magnetic pole 21 via the first magnetic film 221.

In this embodiment, the thin film magnetic head has the same bottom structure as that of the thin film magnetic head shown in FIGS. 1–4, so that the thin film magnetic head can exhibit the same effect as that in FIGS. 1–4.

Figure 9:
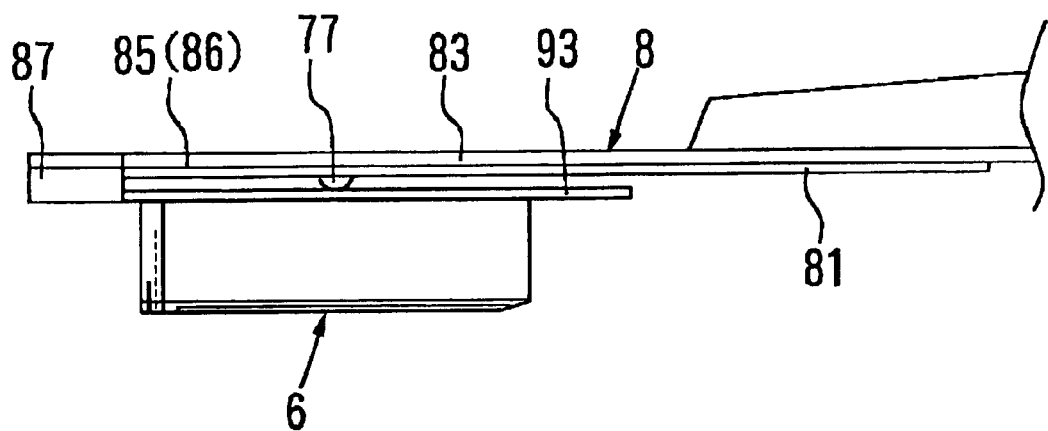
FIG. 9 is a plan view showing a part of the magnetic head device using the thin film magnetic head of the present invention.
Figure 10:
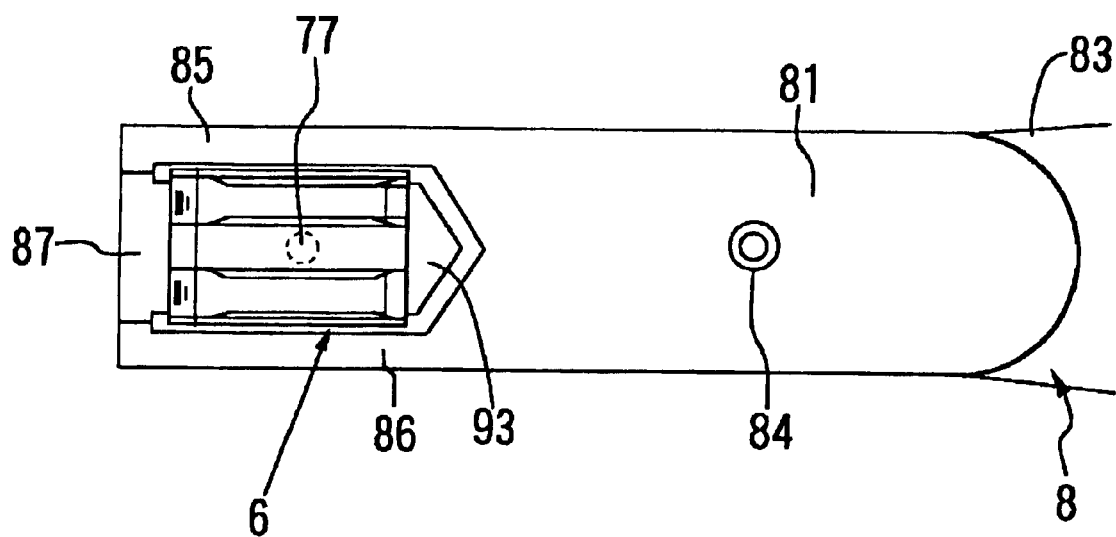
FIG. 10 is a bottom plan view showing a part of the magnetic head device shown in FIG. 9.

FIG. 9 is a plan view showing a part of the magnetic head device of the present invention, and FIG. 10 is a bottom plan view showing the magnetic head device of FIG. 9. The magnetic head device has a head supporting apparatus 8 and a thin film magnetic head 6 according to the present invention which is described in FIGS. 1–7.

The head supporting apparatus 8 supports the thin film magnetic head 6 of the present invention. The head supporting apparatus 8 is composed of a supporter 83 made of metallic plate and a flexibler 81 made of metallic plate provided on the free edge of the supporter 83 in its longitudinal direction. The thin film magnetic head is provided on the lower surface of the flexibler 81.

The flexibler 81 has two outerframes 85 and 86 substantially parallel to the supporter 83 in its longitudinal direction, a lateral frame 87 to join the outerframes 85 and 86 in the remote portion thereof from the supporter 83, and a tongue shaped member 93, of which forefront is free, extending substantially parallel to the outerframes 85 and 86 from the almost central portion of the lateral frame 87.

On the almost central portion of the tongue shaped member 93 is provided a hemispheric loading convex portion 77 bulging on the supporter 83.

The thin film magnetic head 6 is attached to the lower surface of the tongue shaped member 93 by an adhesive agent, etc. Moreover, the thin film magnetic head 6 is provided so that the direction of the air outflow may correspond to the longitudinal direction of the lateral frame 87 and its longitudinal direction may correspond to that of the head supporting apparatus 8. In this invention, any kind of head supporting apparatus may be employed, besides the above head supporting apparatus 8.

Since the above magnetic head device includes the thin film magnetic head of the present invention, it can exhibit all the same effects as the magnetic head.

Figure 11:
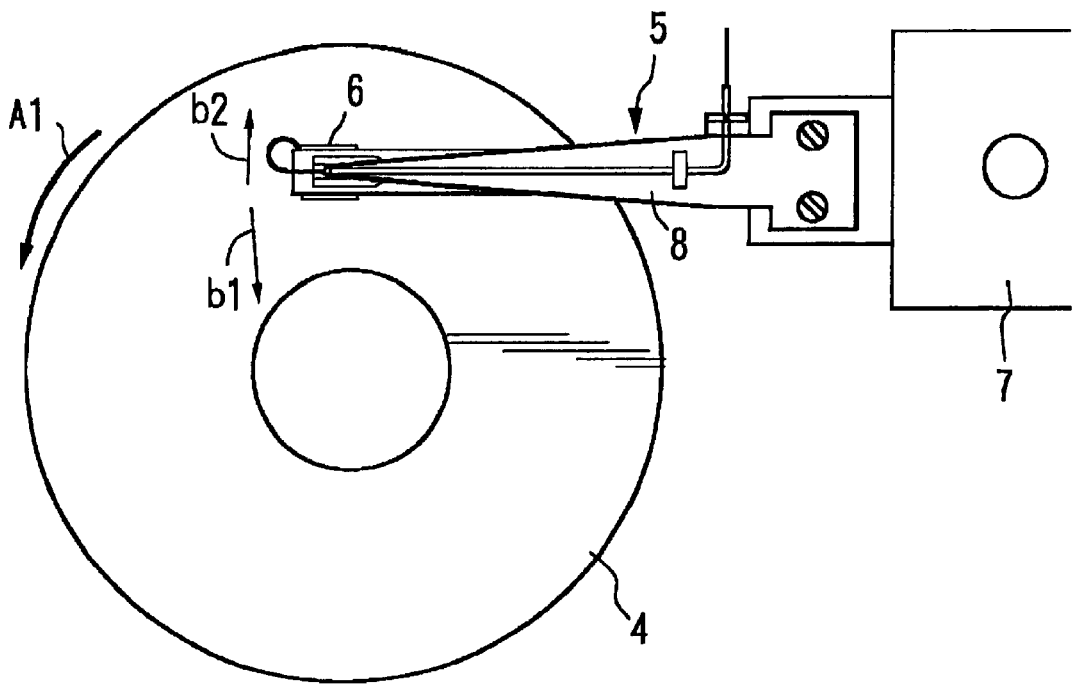
FIG. 11 is a plan view of the magnetic disk driving device using the thin film magnetic head and the magnetic head device of the present invention.

FIG. 11 is a plan view showing a magnetic disk driving device using the thin film magnetic head of the present invention. The magnetic disk driving device has a magnetic head device 5 and at least one magnetic disk.

The magnetic head device 5 is composed of the one shown in FIGS. 9 and 10 having the thin film magnetic head 6 of the present invention shown in FIGS. 1–4. The magnetic head device 5 is mounted on a position determining device 7.

The magnetic head device 5 magnetically write for and read from a magnetic disk 4. Concretely, the magnetic disk 4 is rotated at a high velocity in the Al direction by a not shown driving device. This high velocity rotation generates a buoyant force for the magnetic head 6, and thereby, floats the magnetic head 6 by a minute space (floating space). The position determining device 7 moves the magnetic head 6 on the magnetic disk 4 so that the magnetic head 6 can seek the tracks of the magnetic disk 4 in the b1 direction or the b2 direction, and write/read information for and from the magnetic disk 4.

Since the above magnetic disk driving device includes the thin film magnetic head 6 of the present invention, it can exhibit all the same effects as the magnetic head.

Figure 12:
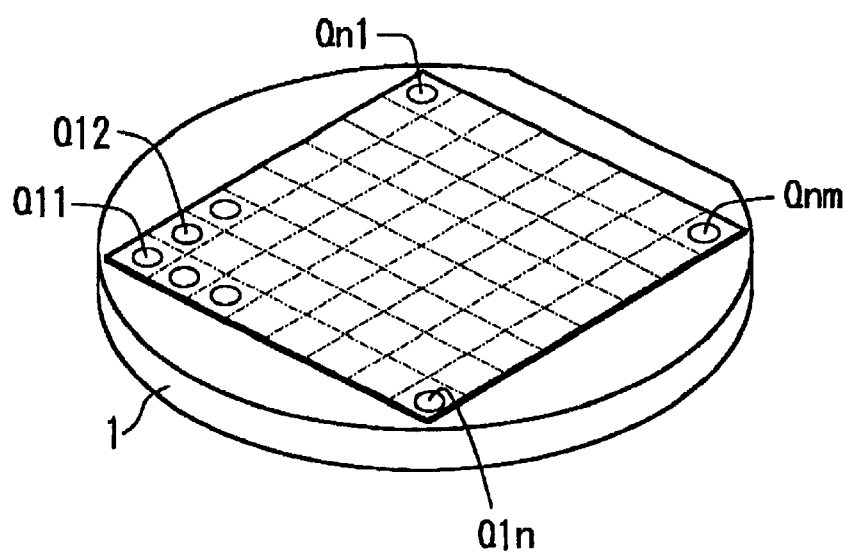
FIG. 12 is a perspective view of the wafer to be used in manufacturing the thin film magnetic head shown in FIGS. 1–4.

A manufacturing method of the thin film magnetic head shown in FIGS. 1–4 will be explained, with reference to FIGS. 12–27. The manufacturing method is performed on a wafer. FIG. 12 is a perspective view showing an example in the wafer. On the wafer to be used as the slider are arranged many thin film magnetic head elements Q11–Q nm. There is shown, in FIG. 13–27, the manufacturing method for the one from among many thin film magnetic head elements Q11–Q nm provided on the wafer 1 in FIG. 12.

Figure 13:
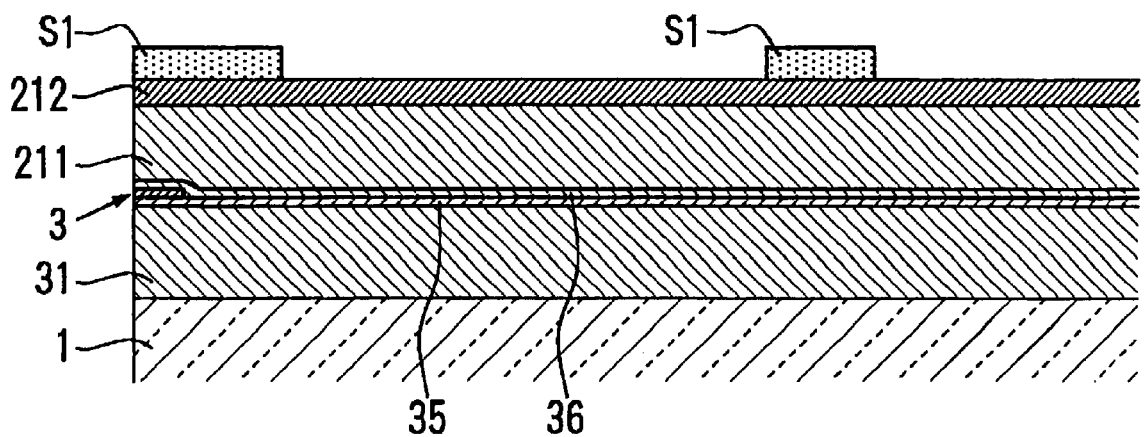
FIG. 13 is a cross sectional view showing a step in the manufacturing method of the thin film magnetic head shown in FIGS. 1–4.
Figure 14:
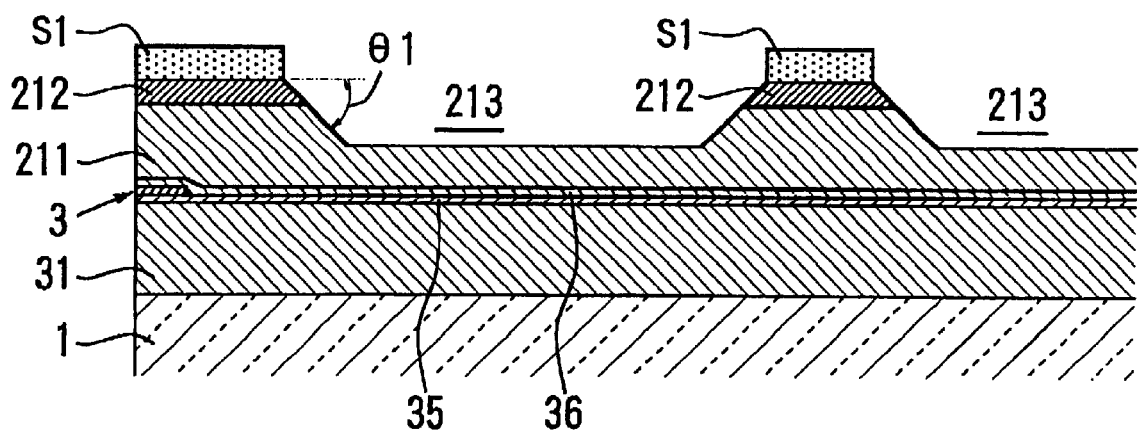
FIG. 14 is a cross sectional view showing the step after the step of FIG. 13.

First of all, as shown in FIGS. 13 and 14, the depressed portion 213 is formed on the magnetic films 211 and 212 formed on the wafer 1 to be used as the slider. The depressed portion 213 is formed by etching so that its inner surface can descend at the first inclination angle θ1. Concretely, as shown in FIG. 13, the first shielding film 31, the insulating films 35, 36, the MR reading element 3 and the magnetic films 211 and 212 doubling as a second shielding film are formed by a well known process, respectively, and thereafter, a mask S1 is formed, of photoresist material, on the magnetic film 212 by a photolithography process. The magnetic film 212 is made of a large coercivity magnetic material such as FeN, FeMN, FeMC, FeMON (M=B, Al, Si, Cr, Ti, Hf, Nb, Ta, Zr, Mo, etc.). The magnetic film 212 may be formed in a thickness of 0.2–3 μm by sputtering, plating or the like. However, the magnetic film 212 may not formed.

Figure 15:
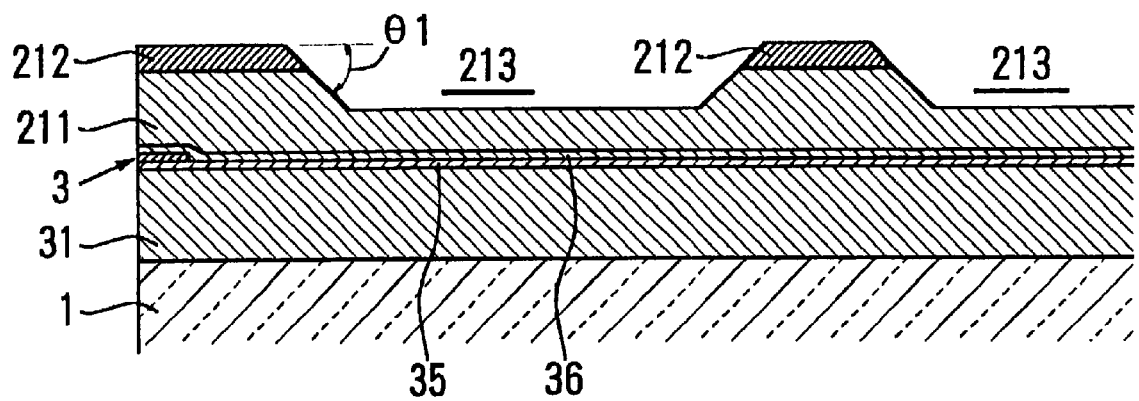
FIG. 15 is a cross sectional view showing the step after the step of FIG. 14.

Subsequently, as shown in FIG. 14, dry-etching is carried out for the assembly shown in FIG. 13 with the mask S1. Ion milling is preferably used as the dry-etching. The depressed portion 213 having its inclined inner surface of the first inclination angle θ1 is formed through the dry-etching process. Thereafter, as shown in FIG. 15, the mask S1 is removed.

Figure 16:
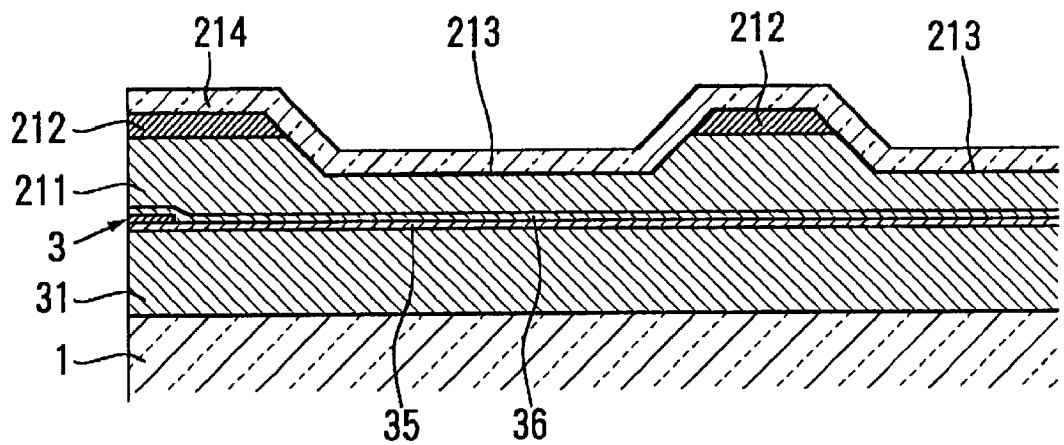
FIG. 16 is a cross sectional view showing the step after the step of FIG. 15.
Figure 17:
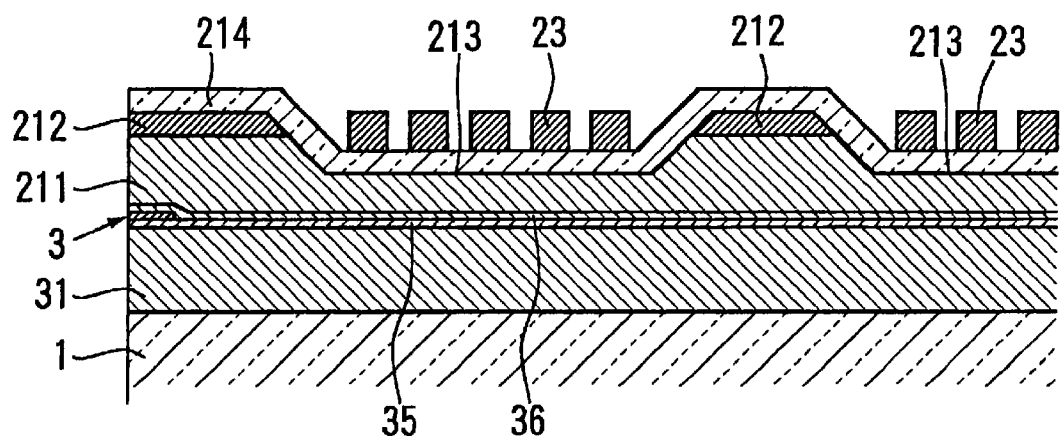
FIG. 17 is a cross sectional view showing the step after the step of FIG. 16.

Then, shown in FIGS. 16 and 17, the coil film 23 is formed in the depressed portion 213 in magnetically insulation from the magnetic film 211. For insulating the coil film 23 from the magnetic film 211, as shown in FIG. 16, before forming the coil film 23, an insulating film 214 is formed on the part of the magnetic film 211 exposing to the inner surface of the depressed portion 213 and the magnetic film 212. The insulating film 214 may be made of a non-magnetic insulating material such as $Al_2O_3$ or $SiO_2$. Moreover, the film 214 is preferably set a thickness of 0.2–0.4 μm. The insulating film 214 may be formed by sputtering.

After forming the insulating film 214, as shown in FIG. 17, the coil film 23 is formed, of Cu material or the like, on the insulating film 214 byba well known photolithography process.

Figure 18:
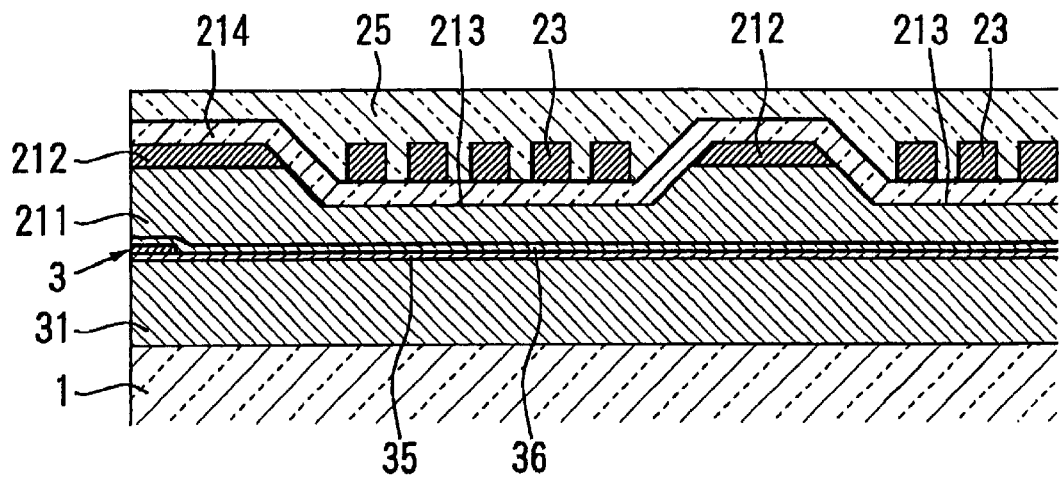
FIG. 18 is a cross sectional view showing the step after the step of FIG. 17.

Next, as shown in FIG. 18, the insulating film 25 is formed so as to cover the coil film 23 in the depressed portion 213 and the insulating film 214 extending beyond the depressed portion 213. The insulating film 25 is formed, of a non-magnetic insulating material such as $Al_2O_3$ or $SiO_2$, by sputtering, and is flattened by CMP (chemical mechanical polishing) method.

Figure 19:
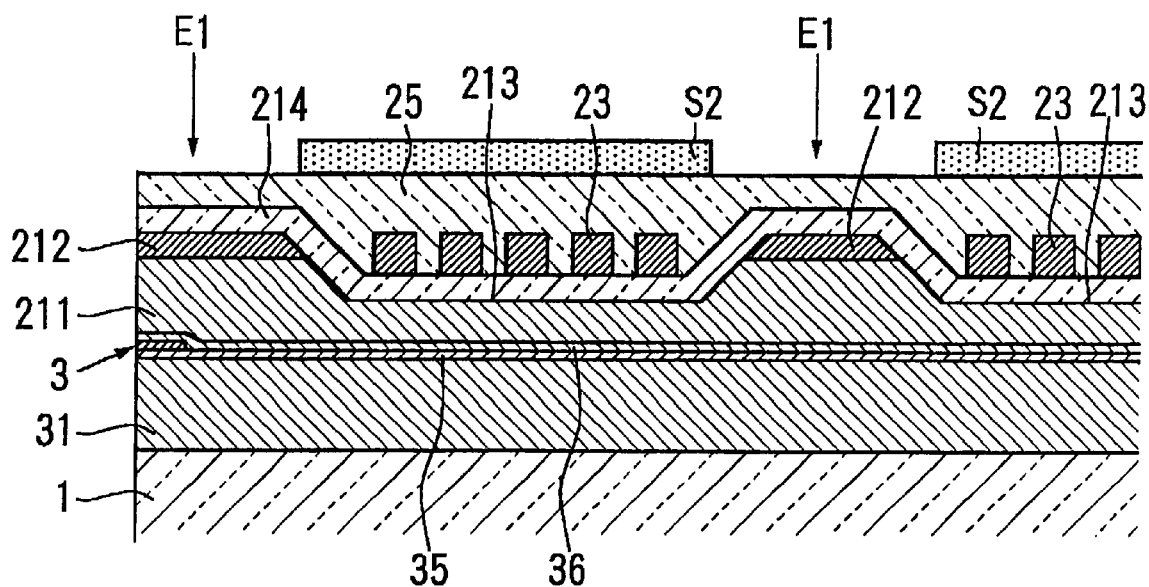
FIG. 19 is a cross sectional view showing the step after the step of FIG. 18.
Figure 20:
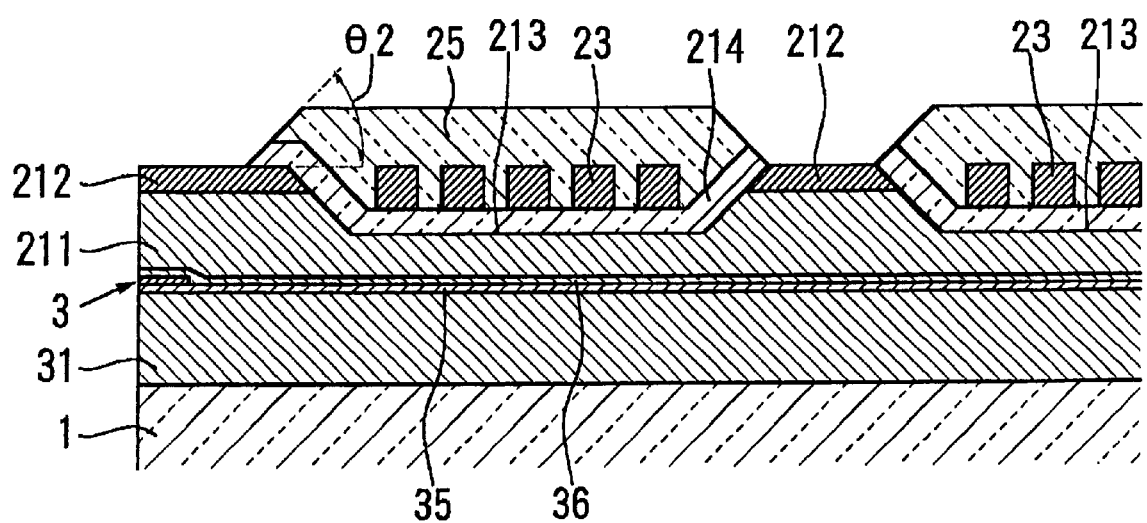
FIG. 20 is a cross sectional view showing the step after the step of FIG. 19.

Subsequently, as shown in FIGS. 19 and 20, the frontward and backward portions of the insulating film 25 for the depressed portion 213 are etched by reactive ion etching (RIE) to make the inclination surfaces of the insulating film 25 and to expose the magnetic film 212. Concretely, as shown in FIG. 19, a mask S2 is formed, above the depressed portion 213, on the flattened insulating film 25. The mask S2 may be made of a photoresist material by a photolithography process. Then, this assembly is etched by the reactive ion etching (RIE) E1 with the mask S2. The RIE can etch the insulating film 25 made of $Al_2O_3$ or $SiO_2$ by sputtering effectively, but can little etch the magnetic film 212 made of the above metallic material or magnetic alloy material. Therefore, as shown in FIG. 20, the inclination surfaces of the second inclination angle θ2 can be made for the insulating film 25, and the magnetic film 212 can be exposed.

Figure 21:
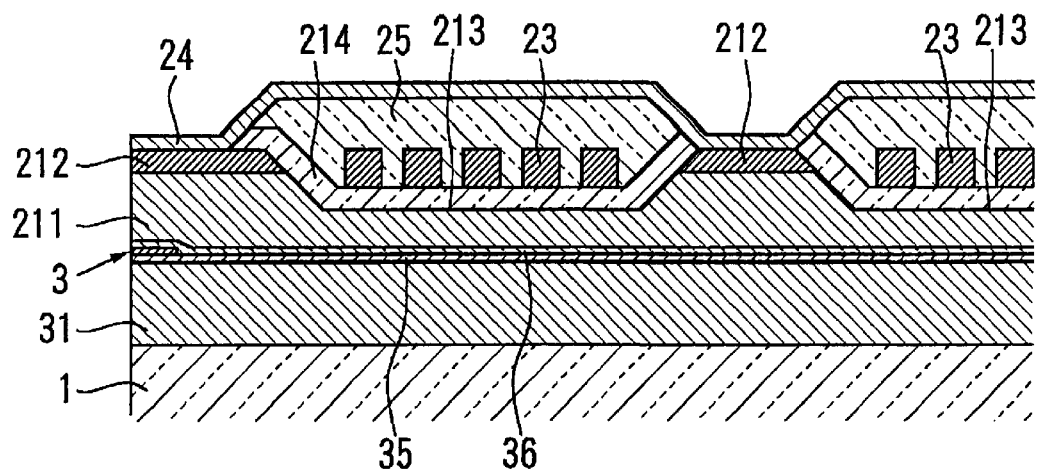
FIG. 21 is a cross sectional view showing the step after the step of FIG. 20.

Then, as shown in FIG. 21, the gap film 24 is formed on the exposed magnetic film 212 and the insulating film 25 by sputtering.

Figure 22:
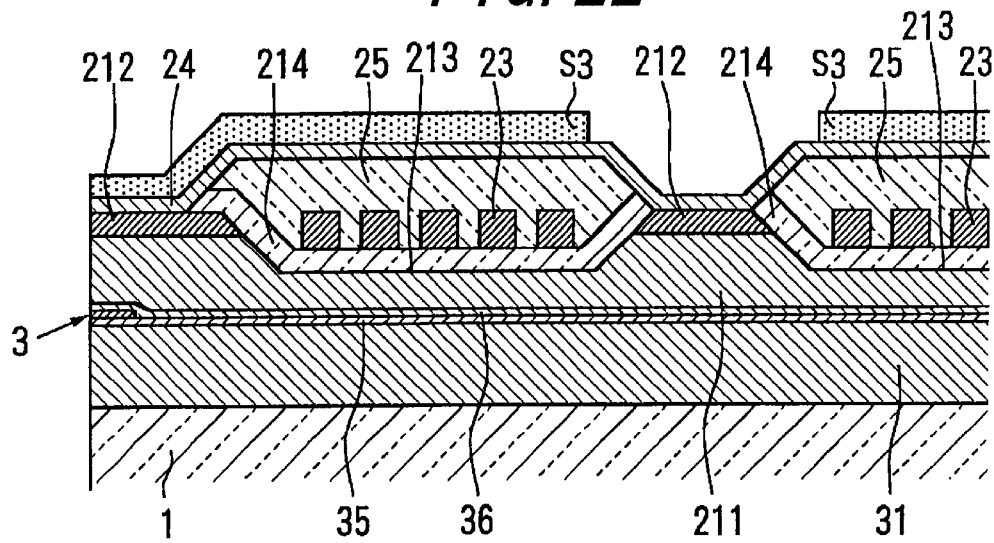
FIG. 22 is a cross sectional view showing the step after the step of FIG. 21.
Figure 23:
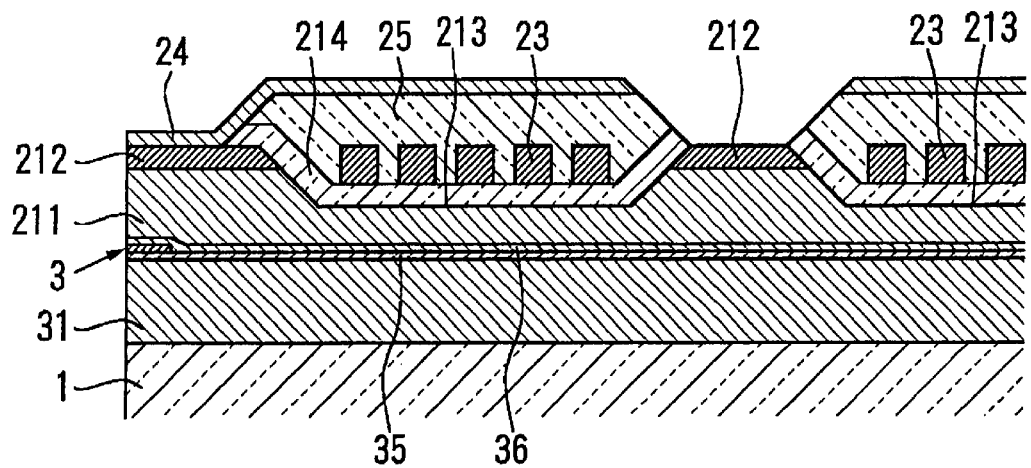
FIG. 23 is a cross sectional view showing the step after the step of FIG. 22.

Subsequently, as shown in FIGS. 22 and 23, the rear portion of the gap film 24 is removed to exposed the magnetic film 212. In this process, first of all, as shown in FIG. 22, a mask S3 is formed on the area except the rear portion of the gap film to be removed, and then, the assembly is dry-etched by ion milling etc., with the mask S3. As a result, the rear portion of the gap film for the depressed portion 213 is removed to expose the magnetic film 212. The mask S3 may be made of a photoresist material by a photolithography process. Thereafter, as shown in FIG. 23, the mask S3 is removed by chemical etching.

Figure 24:
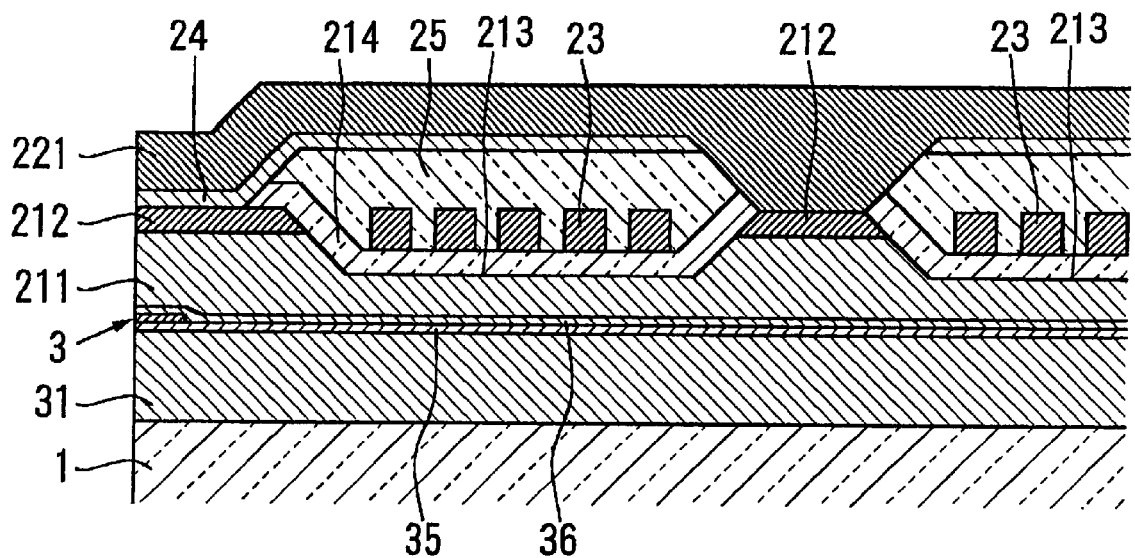
FIG. 24 is a cross sectional view showing the step after the step of FIG. 23.

Then, as shown in FIG. 24, the first magnetic film 221 having a large saturated magnetic flux density is formed on the gap film 24 and the exposed magnetic film 212 backward from the depressed portion 213 by sputtering or the like. The first magnetic film 221 may be made of the above-mentioned material. The first magnetic film 221 is formed so that the lowest part of its upper surface can be located over the upper surface of the insulating film 25.

Figure 25:
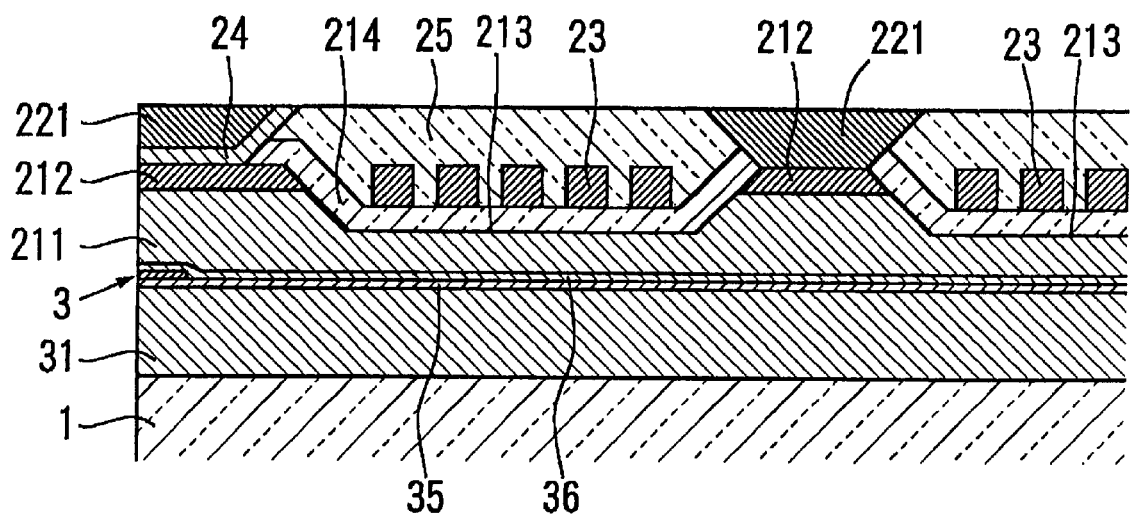
FIG. 25 is a cross sectional view showing the step after the step of FIG. 24.

Subsequently, as shown in FIG. 25, the first magnetic film 221, the gap film 24 and the insulating film 25 are flattened so that they can have the substantially same level surface by CMP.

Figure 26:
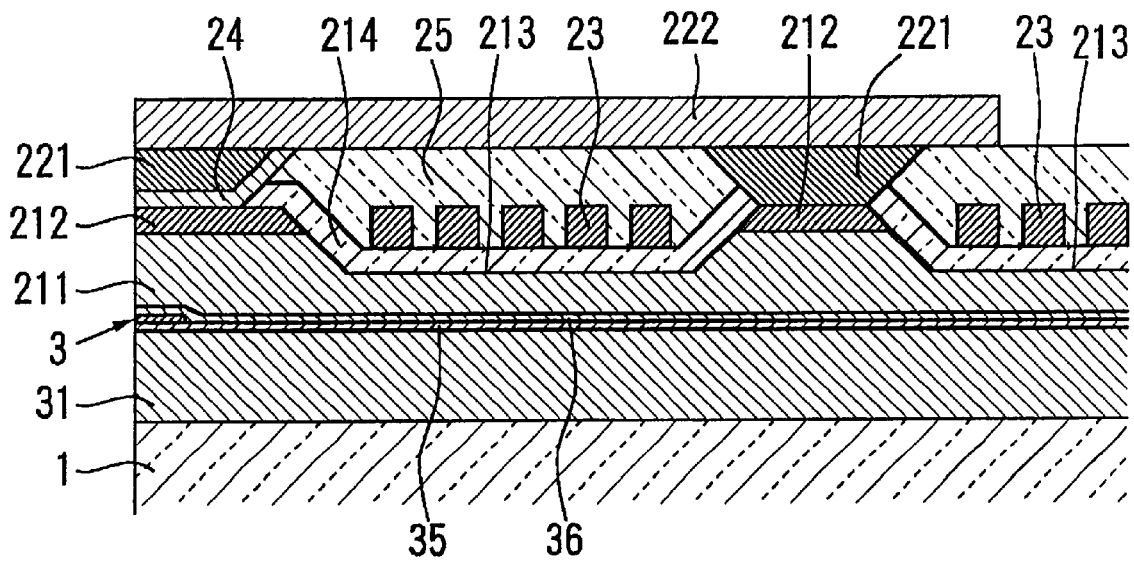
FIG. 26 is a cross sectional view showing the step after the step of FIG. 25.

Next, as shown in FIG. 26, the second magnetic film 222 is formed on the first magnetic film 221 and the insulating film 25 by frame plating method or the like. Since the second magnetic film 222 can be formed flat, the pole portion of the second magnetic film 222 can be formed precisely so as to have a narrowed track width. Not shown in the figure, in forming the second magnetic film 222 by the frame plating method, a plate underfilm is formed by sputtering, etc.

Figure 27:
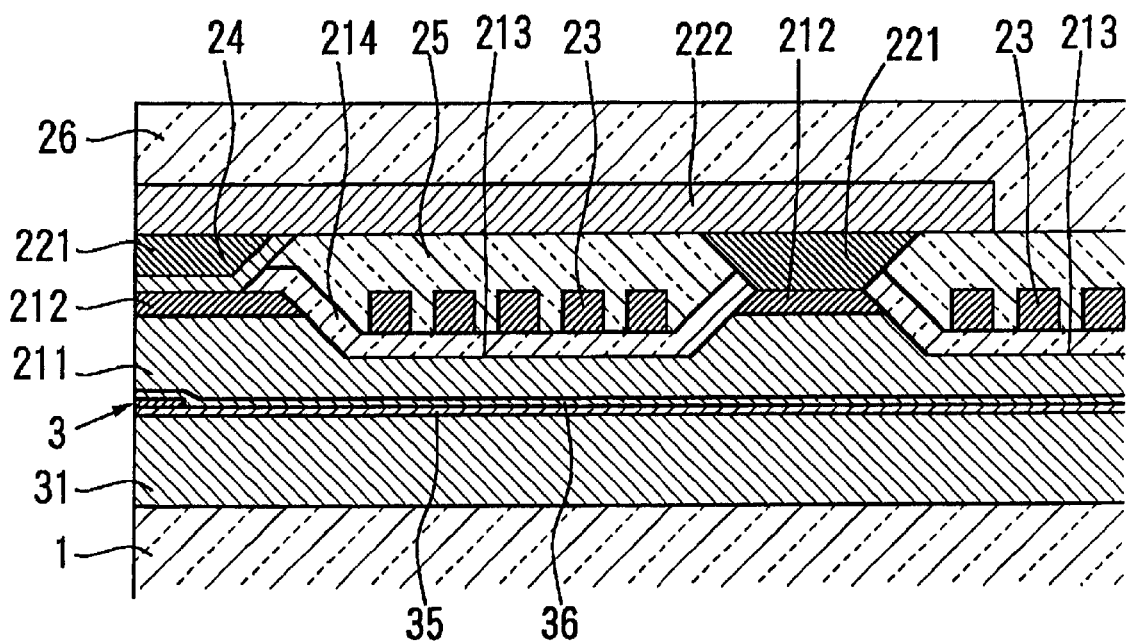
FIG. 27 is a cross sectional view showing the step after the step of FIG. 26.
Figure 28:
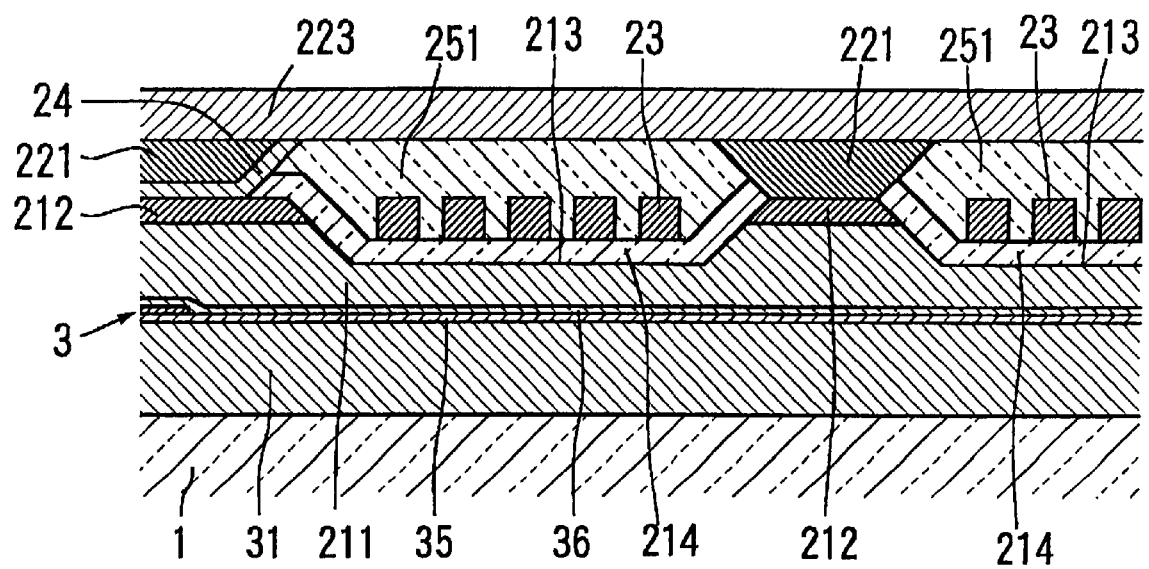
FIG. 28 is a cross sectional view showing a step in the manufacturing method of the thin film magnetic head shown in FIG. 8.

Then, as shown in FIG. 27, the protection film 26 is formed by sputtering, etc. Thereafter, the cutting process of cutting out bars from the wafer, the digging process for the bars, the ABS polishing process or the like are performed to complete the thin film magnetic head of the present invention.

FIGS. 28–35 are cross sectional views showing the manufacturing method of the thin film magnetic head of FIG. 8. The manufacturing method is performed after the steps shown in FIGS. 12–25. As shown in FIG. 25, the first magnetic film 221, the gap film 24 and the insulating film 25 are flattened, and thereafter, a magnetic film 223 is formed on the first magnetic film 221 and the insulating film 25 by a frame plating method. Since the magnetic film 223 is formed flat, the pole portion of the magnetic film 223 can be formed precisely so as to have a narrowed track width. Not shown in the figure, in forming the second magnetic film 223 by the frame plating method, a plate underfilm is formed by sputtering, etc.

Figure 29:
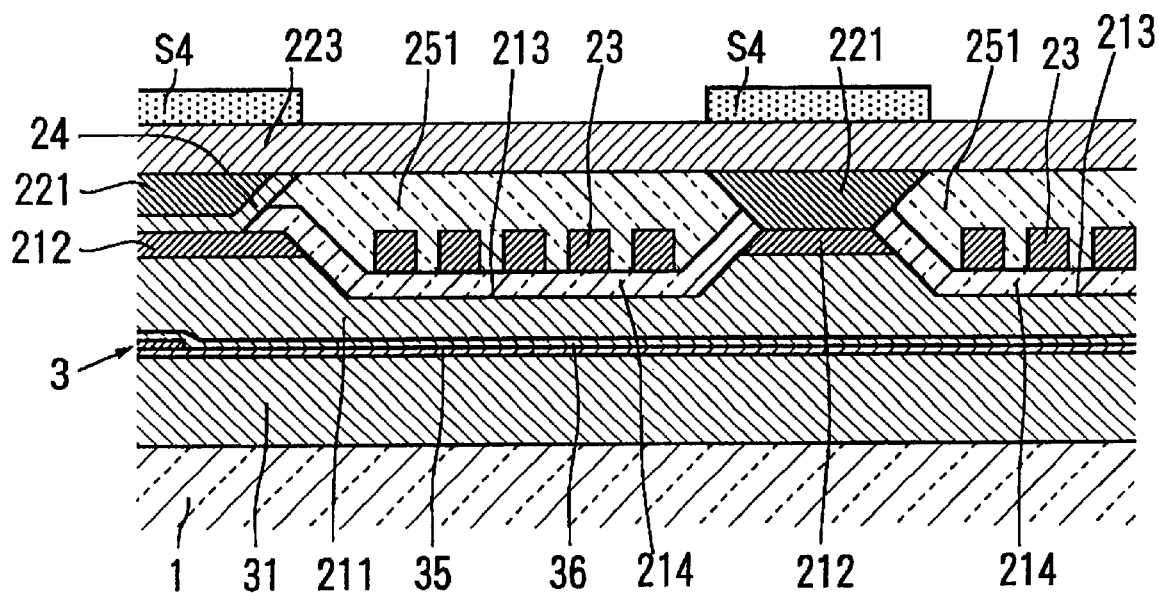
FIG. 29 is a cross sectional view showing the step after the step of FIG. 28.
Figure 30:
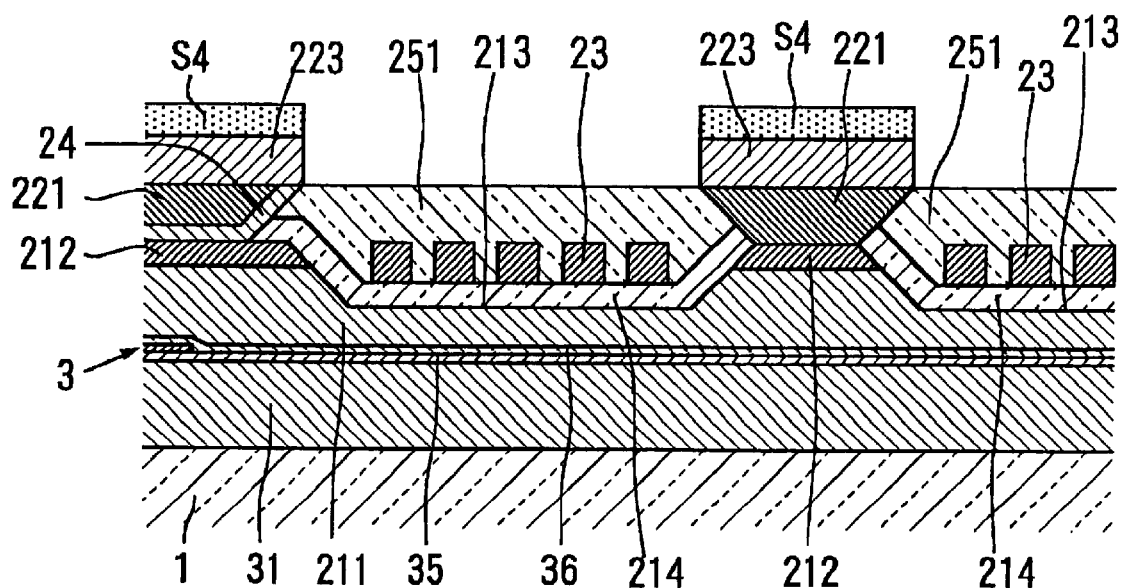
FIG. 30 is a cross sectional view showing the step after the step of FIG. 29.

Then, as shown in FIG. 29, a mask S4 is formed except the area above the depressed portion 213, and the assembly is dry-etched by ion milling or the like. The mask S4 may be made of a photoresist material by a photolithography process. As a result, as shown in FIG. 30, the portion of the magnetic film 223 above the depressed portion 213 is removed.

Figure 31:
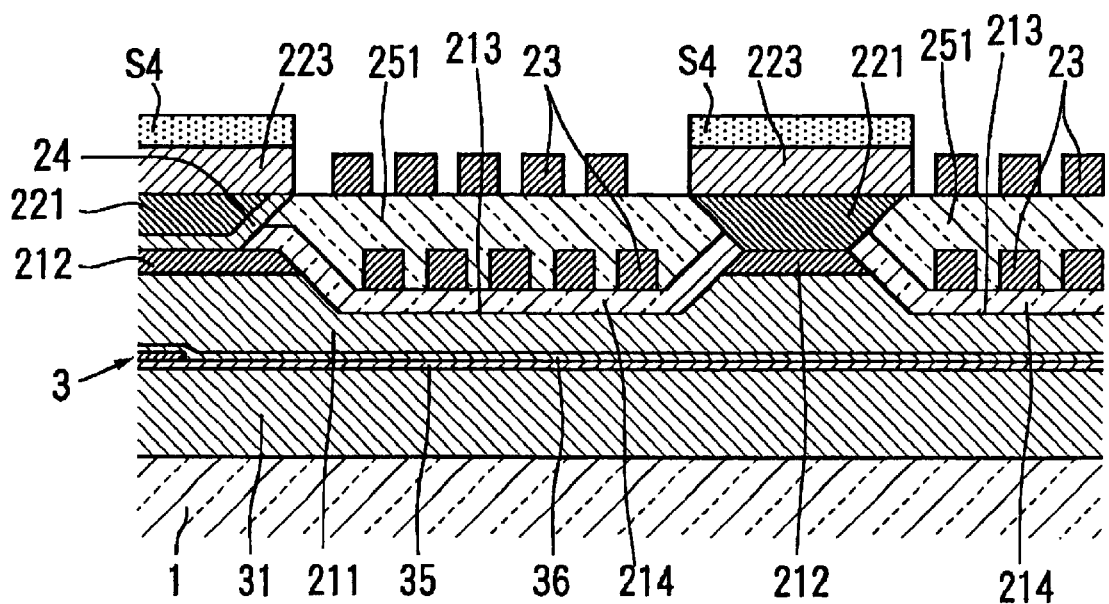
FIG. 31 is a cross sectional view showing the step after the step of FIG. 30.

Next, as shown in FIG. 31, a second layer constituting the coil film 23 is formed on the flat insulating film 251.

Figure 32:
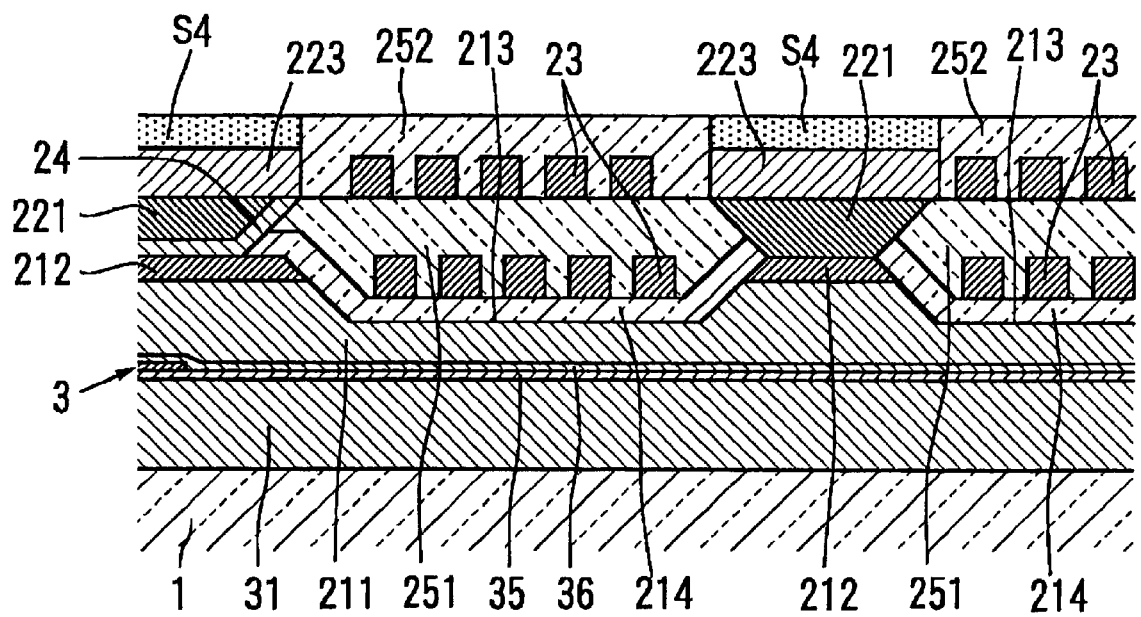
FIG. 32 is a cross sectional view showing the step after the step of FIG. 31.
Figure 33:
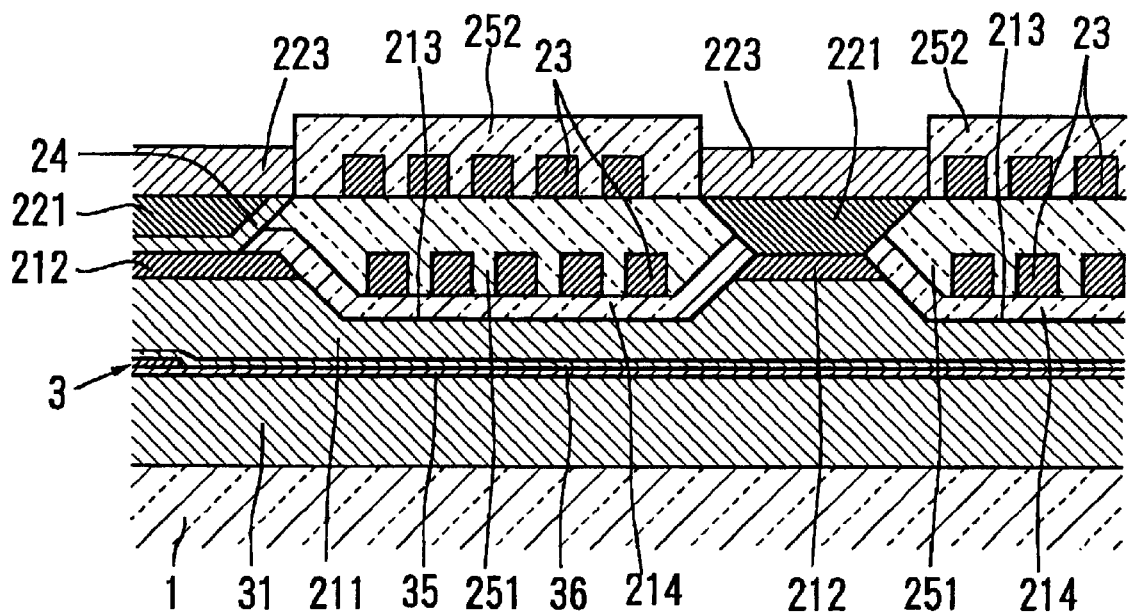
FIG. 33 is a cross sectional view showing the step after the step of FIG. 32.

Then, as shown in FIG. 32, the area around the second layer constituting the coil film 23 is embedded by the insulating film 252. Thereafter, as shown in FIG. 33, the mask S4 is removed by chemical etching.

Figure 34:
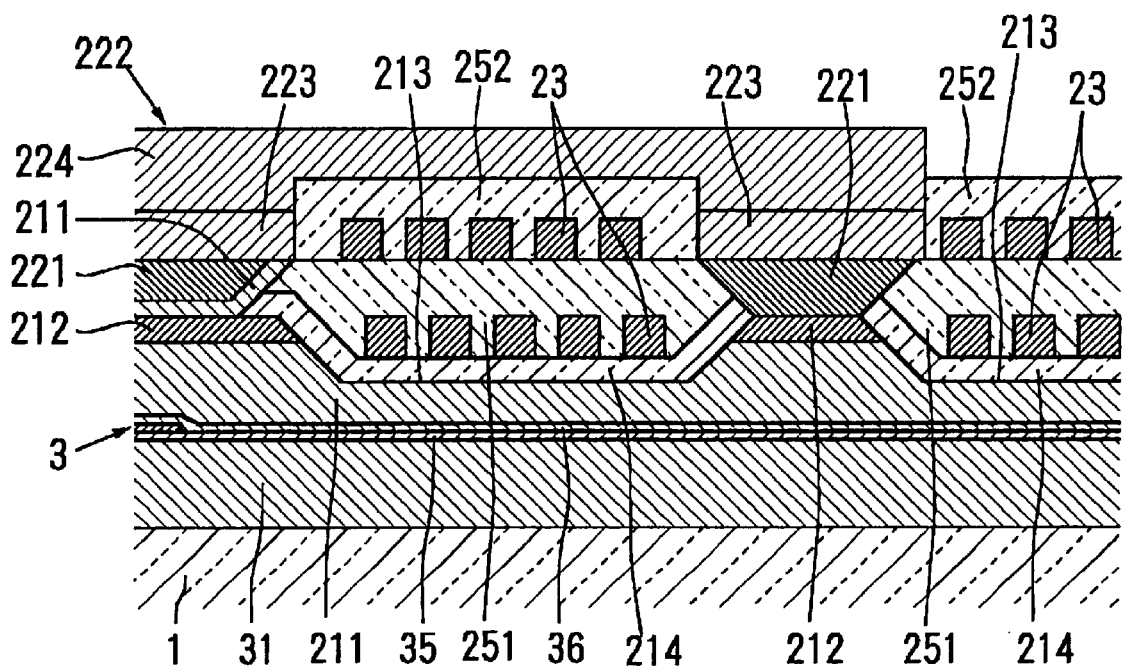
FIG. 34 is a cross sectional view showing the step after the step of FIG. 33.

Next, as shown in FIG. 34, a magnetic film 224 is formed. Not shown in the figure, in forming the second magnetic film 223 by the frame plating method, a plate underfilm is formed by sputtering, etc. As a result, the second magnetic film 222 is formed so as to be composed of the magnetic films 223 and 224. Not shown in the figure, after forming the magnetic film 224, the frame used in the above frame plating method and the plate underfilm under the frame are removed by dry-etching or chemical etching.

Figure 35:
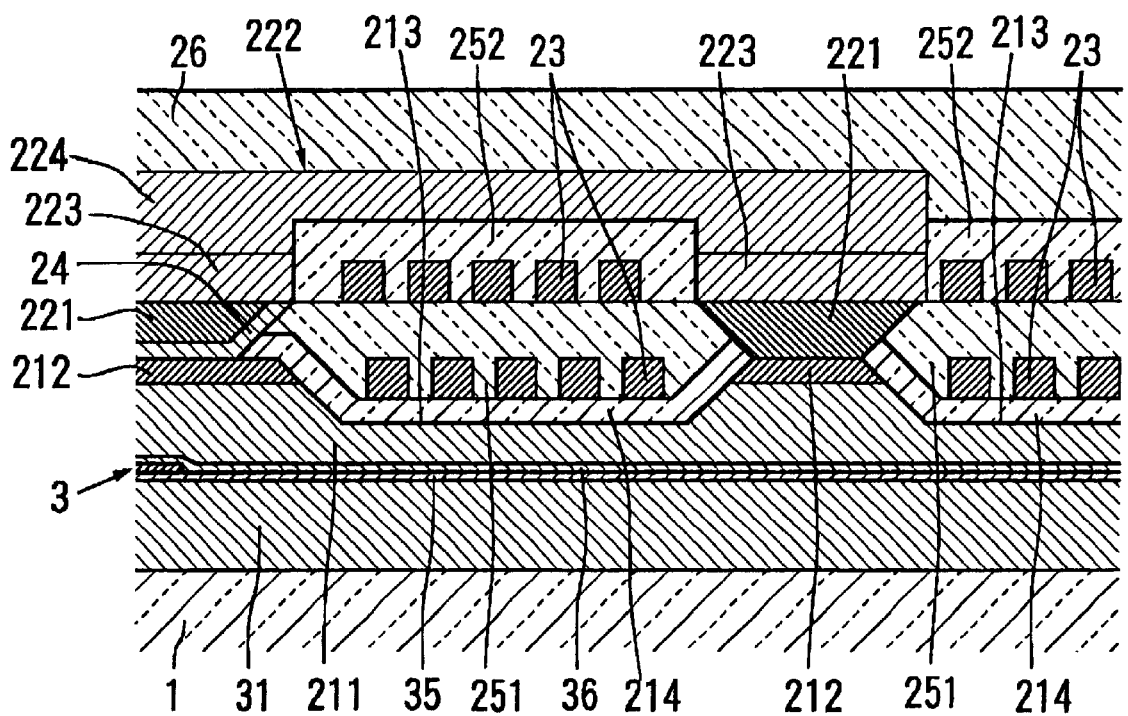
FIG. 35 is a cross sectional view showing the step after the step of FIG. 34.

Subsequently, as shown in FIG. 35, the protection film 26 is formed by sputtering, etc. Thereafter, the cutting process of cutting out bars from the wafer, the digging process for the bars, the ABS polishing process or the like are performed to complete the thin film magnetic head of the present invention.

This invention has been described in detail with reference to the above preferred concrete embodiments, but it is obvious for the ordinary person skilled in the art that various modifications can be made in its configuration and detail without departing from the scope of this invention.

As mentioned above, this invention can provide the following effects:

(a) A thin film magnetic head having a recording pole structure of high recording performance can be provided.

(b) A thin film magnetic head having a recording pole structure to be used for high density recording can be provided.

(c) A thin film magnetic head not to be saturated magnetically having excellent high frequency recording characteristics can be provided.

(d) A thin film magnetic head having a small Apex Angle in which a Throat Height zero point can be controlled high precisely can be provided.

(e) A magnetic head device and a magnetic disk driving device using the above thin film magnetic head can be provided.

(f) A manufacturing method suitable for the thin film magnetic head can be provided.

What is claimed is:

1. A thin film magnetic head comprising a slider having a medium opposing surface and at least one recording element including a first pole portion composed of a magnetic film, a second pole portion composed of first and second magnetic films, a gap film, a coil film, and an insulating film, the first pole portion extending backward from the medium opposing surface and having a depressed portion to descend from a first inclination starting point at a first inclination angle θ1 backward from the medium opposing surface, the insulating film being filled up into the depressed portion so that the insulation film includes an inclined surface at least in the side facing the medium opposing surface and it can be located up to the upper side of the surface of the magnetic film constituting the first pole portion, the gap film being adjacent to the first pole portion and having an inclined portion alongside the inclined surface of the insulating film, the coil film being embedded into the insulating film, the first magnetic film having a larger saturated magnetic flux density than the second magnetic film, adjacent to the gap film, and having an inclined portion of a second inclination angle θ2 from a second inclination starting point positioned at the base portion of the inclined portion of the gap, the second magnetic film being formed on the insulating film, adjacent to the first magnetic film, and extending backward from the medium opposing surface to be joined with the magnetic film constituting the first pole portion.

2. A thin film magnetic head as defined in claim 1, wherein the first pole portion is composed of two adjacent magnetic films, the one magnetic film extending backward from the medium opposing surface and having the depressed portion of the first inclination angle θ1, the other magnetic film having a larger saturated magnetic flux density than the one magnetic film and being adjacent to the gap film.

3. A thin film magnetic head as defined in claim 1, wherein the second inclination starting point is located nearer the medium opposing surface than the first inclination starting point.

4. A thin film magnetic head as defined in claim 1, wherein the second inclination angle θ2 is within 20 degrees and 60 degrees.

5. A thin film magnetic head as defined in claim 1, wherein the first inclination angle θ1 is within 20 degrees and 60 degrees.

6. A thin film magnetic head as defined in claim 1, wherein the magnetic film constituting the first pole portion and the first magnetic film constituting the second pole portion have a thickness of 2.0 μm or below, respectively.

7. A thin film magnetic head as defined in claim 1, wherein the insulating film is composed of a ceramic insulating film.

8. A thin film magnetic head as defined in claim 1, wherein the first magnetic film and the insulating film are formed so that they can have the substantially same level surfaces, and the second magnetic film is formed on the same level surfaces.

9. A thin film magnetic head as defined in claim 8, wherein the coil film is composed of a single layer, and the second magnetic film is formed continuously over the substantially same level surfaces of the first magnetic film and the insulating film.

10. A thin film magnetic head as defined in claim 8, wherein the coil film is composed of plural layers and the insulating film is composed of plural layers, which are stacked in turn, depending on the layer number of the coil film, the bottom layer of the insulating film being formed so as to fill up the depressed portion of the first inclination angle θ1 and to have the substantially same level surface as that of the first magnetic film, and the second magnetic film is formed on the top layer of the insulating film.

11. A thin film magnetic head as defined in claim 1, further comprising a reading element using a magnetoresistive effect.

12. A thin film magnetic head as defined in claim 11, wherein the reading element includes a spin valve film structure.

13. A thin film Magnetic head as defined in claim 11, wherein the reading element includes a perovskite type magnetic body.

14. A thin film magnetic head as defined in claim 11, wherein the reading element includes a ferromagnetic tunnel junction element.

15. A thin film magnetic head as defined in claim 11, wherein the reading element is provided under the recording element.

16. A thin film magnetic head as defined in claim 11, wherein the reading element is provided above the recording element.

17. A magnetic head device comprising a thin film magnetic head as defined in claim 1 and a head supporting apparatus.

18. A magnetic disk driving device comprising a magnetic head device as defined in claim 17 and at least one magnetic disk which is magnetically recorded and reproduced by the magnetic head device.

* * * * *